(12) United States Patent
Yonezawa

(10) Patent No.: US 12,155,813 B2
(45) Date of Patent: Nov. 26, 2024

(54) DISPLAY APPARATUS FOR SUPPRESSION OF GENERATION OF UNNECESSARY LIGHT OTHER THAN IMAGE DISPLAY LIGHT TO A WEARER OF DISPLAY APPARATUS

(71) Applicant: SONY GROUP CORPORATION, Tokyo (JP)

(72) Inventor: Takeshi Yonezawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 25 days.

(21) Appl. No.: 18/004,311

(22) PCT Filed: Jun. 16, 2021

(86) PCT No.: PCT/JP2021/022766
§ 371 (c)(1),
(2) Date: Jan. 5, 2023

(87) PCT Pub. No.: WO2022/014239
PCT Pub. Date: Jan. 20, 2022

(65) Prior Publication Data
US 2023/0254472 A1 Aug. 10, 2023

(30) Foreign Application Priority Data
Jul. 16, 2020 (JP) ................................ 2020-121928

(51) Int. Cl.
*H04N 13/344* (2018.01)
*G02B 27/01* (2006.01)
(Continued)

(52) U.S. Cl.
CPC ....... *H04N 13/344* (2018.05); *G02B 27/0172* (2013.01); *G02B 27/30* (2013.01); *G02B 27/4205* (2013.01)

(58) Field of Classification Search
CPC .. H04N 13/344; G02B 27/0172; G02B 27/30; G02B 27/4205
See application file for complete search history.

(56) References Cited

U.S. PATENT DOCUMENTS

| | | | |
|---|---|---|---|
| 2015/0277125 A1* | 10/2015 | Hirano | G02B 27/0176 359/633 |
| 2016/0178910 A1* | 6/2016 | Giudicelli | G02B 27/0172 359/633 |

(Continued)

FOREIGN PATENT DOCUMENTS

| | | |
|---|---|---|
| JP | 2015-102613 A | 6/2015 |
| JP | 2019-082531 A | 5/2019 |

(Continued)

OTHER PUBLICATIONS

International Search Report and Written Opinion of PCT Application No. PCT/JP2021/022766, issued on Sep. 7, 2021, 10 pages of ISRWO.

*Primary Examiner* — Afroza Chowdhury

(57) ABSTRACT

A display apparatus that includes an image display element, a collimating optical system that collimates light emitted from the image display element, a light guide plate on which light emitted from the collimating optical system is incident and that totally reflects and guides the light being incident, a first optical element that is disposed on the light guide plate and introduces the light being incident into the light guide plate, and multiple second optical elements that are disposed on the light guide plate and emit light propagated by total reflection in the light guide plate to outside of the light guide plate. The display apparatus is capable of suppressing generation of light (unnecessary light) other than light (image display light) to a wearer and suppressing manufacturing costs of the display apparatus.

18 Claims, 10 Drawing Sheets

(51) Int. Cl.
*G02B 27/30* (2006.01)
*G02B 27/42* (2006.01)

(56) References Cited

U.S. PATENT DOCUMENTS

2019/0212699 A1* 7/2019 Waldern ............... G03H 1/0408
2020/0319461 A1* 10/2020 Schultz ............... G02B 6/0016

FOREIGN PATENT DOCUMENTS

| JP | 2019-515358 A | 6/2019 |
| JP | 2020-008599 A | 1/2020 |
| WO | 2019/136473 A1 | 7/2019 |

* cited by examiner

DISPLAY APPARATUS FOR SUPPRESSION OF GENERATION OF UNNECESSARY LIGHT OTHER THAN IMAGE DISPLAY LIGHT TO A WEARER OF DISPLAY APPARATUS

CROSS REFERENCE TO RELATED APPLICATIONS

This application is a U.S. National Phase of International Patent Application No. PCT/JP2021/022766 filed on Jun. 16, 2021, which claims priority benefit of Japanese Patent Application No. JP 2020-121928 filed in the Japan Patent Office on Jul. 16, 2020. Each of the above-referenced applications is hereby incorporated herein by reference in its entirety.

TECHNICAL FIELD

The present technology relates to a display apparatus.

BACKGROUND ART

In recent years, attention has been paid to a technology of displaying an image in superimposition on an outside scene such as a real landscape, for example. This technology is also referred to as an augmented reality (AR) technology. One of the products using this technology is a head mounted display. The head mounted display is used by being worn on the head of a user. In a method of displaying a video (image) using a head mounted display, for example, light from the head mounted display reaches the eyes of the user (wearer) in addition to light from outside, and thus the user recognizes that a video by the light from the display is superimposed on an outside image.

For example, Patent Document 1 proposes a technology capable of displaying a high-quality video with a simple configuration by using an optical device including a light guide, a diffractive optical element, and the like.

Furthermore, for example, Patent Document 2 proposes a technology related to a reflective lens module capable of providing a user (wearer) with a deep-depth image.

CITATION LIST

Patent Document

Patent Document 1: Japanese Patent Application Laid-Open No. 2015-102613
Patent Document 2: Japanese Patent Application National Publication (Laid-Open) No. 2019-515358

SUMMARY OF THE INVENTION

Problems to be Solved by the Invention

However, in the technologies proposed in Patent Documents 1 and 2, there is a possibility that generation of light (which may be referred to as unnecessary light) other than light (image display light) to the wearer cannot be suppressed, and manufacturing costs of the display apparatus (image display apparatus) cannot be suppressed.

Therefore, the present technology has been made in light of such circumstances, and a main object of the present technology is to provide a display apparatus capable of suppressing generation of light (unnecessary light) other than light (image display light) to a wearer and suppressing manufacturing costs of the display apparatus (image display apparatus).

Solutions to Problems

As a result of intensive research to solve the above object, the present inventors have surprisingly succeeded in suppressing generation of light (unnecessary light) other than light (image display light) to a wearer and suppressing manufacturing costs of a display apparatus (image display apparatus), and have completed the present technology.

That is, the present technology provides a display apparatus including an image display element, a collimating optical system that collimates light emitted from the image display element, a light guide plate on which light emitted from the collimating optical system is incident and that totally reflects and guides the light being incident, a first optical element that is disposed on the light guide plate and introduces the light being incident into the light guide plate, and multiple second optical elements that are disposed on the light guide plate and emit light propagated by total reflection in the light guide plate to outside of the light guide plate.

In the display apparatus of the present technology, the multiple second optical elements may be disposed apart from each other.

In the display apparatus of the present technology, the multiple second optical elements and the light guide plate may be formed by integral molding.

In the display apparatus of the present technology, the multiple second optical elements and the light guide plate may include substantially the same material.

In the display apparatus of the present technology, the multiple second optical elements and the light guide plate may be formed by integral molding, and in that case, the multiple second optical elements and the light guide plate may include substantially the same material.

In the display apparatus of the present technology, each of the multiple second optical elements may be a reflective or transmissive volume hologram.

In the display apparatus of the present technology, the first optical element may be a reflective or transmissive volume hologram.

In the display apparatus of the present technology, each of the first optical element and the multiple second optical elements may be a reflective or transmissive volume hologram.

In the display apparatus of the present technology, the first optical element may include a light transmitting member.

In the display apparatus of the present technology, the first optical element may include a light reflecting member.

In the display apparatus of the present technology, the light guide plate may have at least a first surface and a second surface, the first surface may be disposed on a pupil side, the second surface may be disposed on an opposite side of the pupil side, the multiple second optical elements may be disposed on the first surface, and the multiple second optical elements may be disposed on the second surface.

In the display apparatus of the present technology, the multiple second optical elements disposed on the first surface and the multiple second optical elements disposed on the second surface may face each other.

In the display apparatus of the present technology, an amount of transmitted diffracted light transmitted through the multiple second optical elements disposed on the first surface may be larger than an amount of reflected diffracted light reflected by the multiple second optical elements disposed on the first surface.

In the display apparatus of the present technology, an amount of transmitted diffracted light transmitted through the multiple second optical elements disposed on the second surface may be smaller than an amount of reflected diffracted light reflected by the multiple second optical elements disposed on the second surface.

In the display apparatus of the present technology, the amount of transmitted diffracted light transmitted through the multiple second optical elements disposed on the first surface may be larger than the amount of reflected diffracted light reflected by the multiple second optical elements disposed on the first surface, and furthermore, the amount of transmitted diffracted light transmitted through the multiple second optical elements disposed on the second surface may be smaller than the amount of reflected diffracted light reflected by the multiple second optical elements disposed on the second surface.

In the display apparatus of the present technology, each of the second optical elements of the multiple second optical elements may have diffraction efficiency that increases farther away from the first optical element.

In the display apparatus of the present technology, a distance between each of the second optical elements of the multiple second optical elements and the second optical element adjacent to each of the second optical elements of the multiple second optical elements may decrease farther away from the first optical element.

In the display apparatus of the present technology, a ratio of an area in plan view of each of the second optical elements of the multiple second optical elements to an area in plan view of the light guide plate between each of the second optical elements of the multiple second optical elements and the second optical element adjacent to each of the second optical elements of the multiple second optical elements may increase farther away from the first optical element.

The present technology can suppress generation of light (unnecessary light) other than light (image display light) to a wearer and suppress manufacturing costs of the display apparatus (image display apparatus). Note that the effects described herein are not necessarily limited, and may be any of the effects described in the present disclosure.

MODE FOR CARRYING OUT THE INVENTION

Figure 1A:
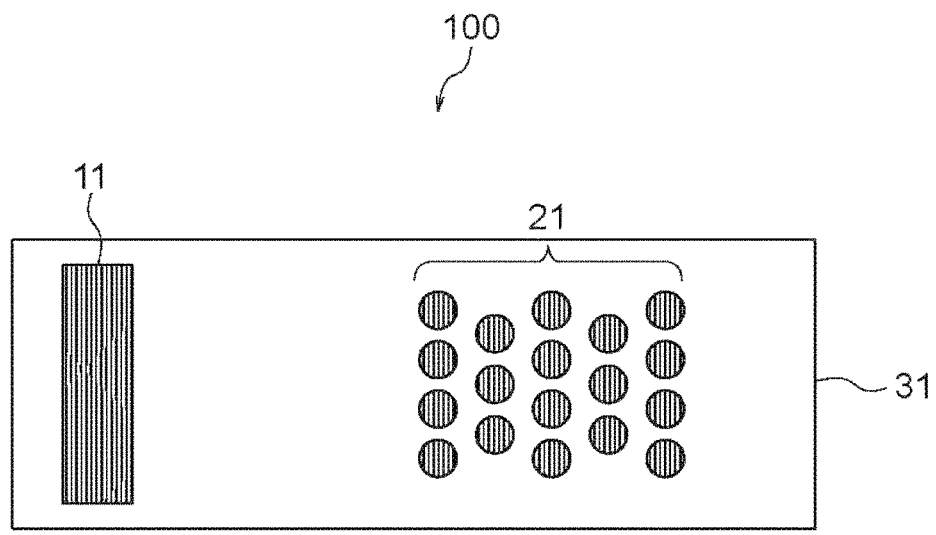
FIGS. 1A and 1B are diagrams illustrating a configuration example of a display apparatus according to a first embodiment to which the present technology is applied.

Hereinafter, preferred embodiments for implementing the present technology will be described. The embodiments described below illustrates an example of a representative embodiment of the present technology, and the scope of the present technology is not narrowly interpreted by the embodiments. Note that, in the drawings, unless otherwise specified, "upper" means upward or an upper side in the drawings, "lower" means downward or a lower side in the drawings, "left" means leftward or a left side in the drawings, and "right" means rightward or a right side in the drawings. In addition, in the description using the drawings, the same or equivalent elements or members are denoted by the same reference signs, and redundant description is omitted.

Note that the description will be made in the following order.

1. Overview of the present technology
2. First embodiment (Example 1 of display apparatus)
3. Second embodiment (Example 2 of display apparatus)
4. Third embodiment (Example 3 of display apparatus)
5. Fourth embodiment (Example 4 of display apparatus)
6. Fifth embodiment (Example 5 of display apparatus)
7. Sixth embodiment (Example 6 of display apparatus)
8. Seventh embodiment (Example 7 of display apparatus)
9. Eighth embodiment (Example 8 of display apparatus)
10. Ninth embodiment (Example 9 of display apparatus)
11. Tenth embodiment (Example 10 of display apparatus)

1. Overview of the Present Technology

First, an overview of the present technology will be described. The present technology relates to a display apparatus.

First, an example of other technologies other than the present technology will be described.

As Example 1 of other technologies, there is a technology using a light guide plate provided with a diffractive optical element for a display apparatus (image display apparatus).

In Example 1 of other technologies, simultaneously with a video signal to a wearer, light diffracted to the opposite side of the pupil of the wearer may also occur to the same extent, and there is a problem that the eyes of the wearer appear to be shining when viewed from people other than the person wearing the display apparatus (image display apparatus).

As a second example of other technologies, there is a technology in which a mirror is disposed inside a light guide plate to provide a video with a deep depth by a pinhole effect.

In Example 2 of other technologies, it is necessary to separately manufacture and bond an optical component provided with a mirror and an optical component not provided with a mirror, and there is a possibility of an increase in manufacturing costs.

The present technology has been made in view of the above circumstances.

In the present technology, there is proposed a display apparatus including an image display element, a collimating optical system that collimates light emitted from the image display element, a light guide plate on which light emitted from the collimating optical system is incident and that totally reflects and guides the light being incident, a first optical element that is disposed on the light guide plate and introduces the light being incident into the light guide plate, and multiple second optical elements (which may be referred to as a second optical element group) that are disposed on the light guide plate and emit light propagated by total reflection in the light guide plate to outside of the light guide plate. The display apparatus of the present technology can be applied to, for example, an eyewear display, a head mounted display, and the like.

In the display apparatus of the present technology, the multiple second optical elements are preferably disposed apart from each other. For example, it is preferable that the multiple second optical elements are arranged in a dot shape (point shape) in plan view from a front surface of the light guide plate. Furthermore, when the display apparatus of the present technology is manufactured, the light guide plate and the multiple second optical elements may be manufactured by integral molding (for example, injection molding) preferably with the same material.

The present technology can suppress generation of light (unnecessary light) other than light (image display light) to the wearer by using the multiple second optical elements (second optical element group), reduce a phenomenon in which light from the wearer appear to be shining when viewed from the outside, show a video with a deep depth, and provide a video (image) with a focus free effect, that is, a video (image) in which focus is achieved regardless of a focus state of the wearer.

Furthermore, in the present technology, for example, since the light guide plate and the multiple second optical elements are manufactured by integral molding (for example, injection molding), a display apparatus (image display apparatus) with low manufacturing costs can be provided.

Hereinafter, preferred embodiments for implementing the present technology will be described in detail. The embodiments described below illustrates an example of a representative embodiment of the present technology, and the scope of the present technology is not narrowly interpreted by the embodiments.

2. First Embodiment (Example 1 of Display Apparatus)

A display apparatus according to a first embodiment (Example 1 of a display apparatus) of the present technology is a display apparatus including an image display element, a collimating optical system that collimates light emitted from the image display element, a light guide plate on which light emitted from the collimating optical system is incident and that totally reflects and guides the light being incident, a first optical element that is disposed on the light guide plate and introduces the light being incident into the light guide plate, and multiple second optical elements (a second optical element group) that are disposed on the light guide plate and emit light propagated by total reflection in the light guide plate to outside of the light guide plate. In the display apparatus according to the first embodiment (Example 1 of the display apparatus) of the present technology, the multiple second optical elements are preferably disposed apart from each other on the light guide plate.

Hereinafter, the display apparatus according to the first embodiment (Example 1 of the display apparatus) of the present technology will be specifically described with reference to FIGS. 1A, 1B, 2A, 2B, 3A, and 3B.

Figure 1B:
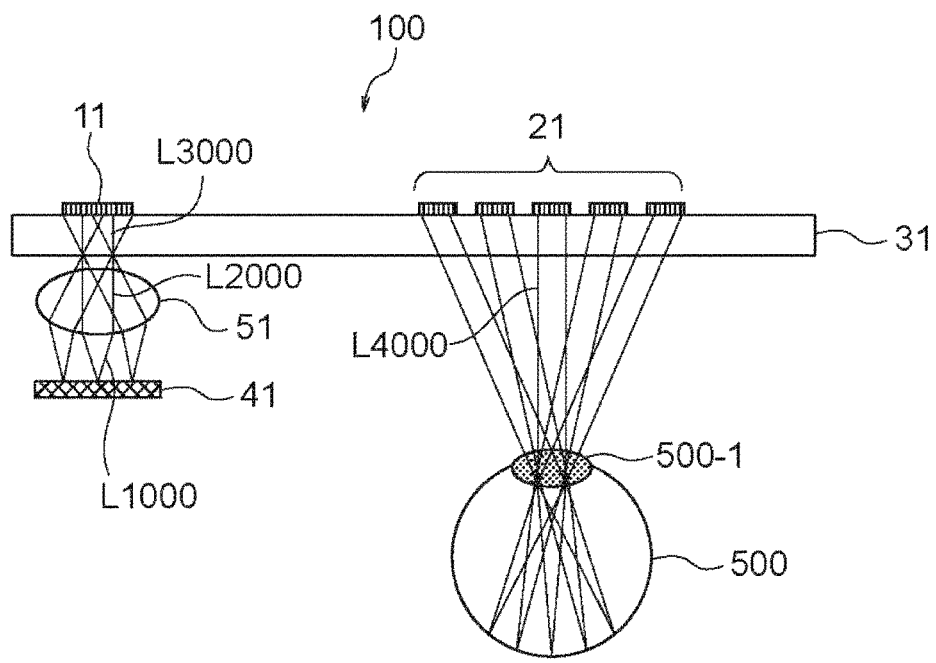

First, a configuration example of the display apparatus according to the first embodiment of the present technology will be described with reference to FIGS. 1A and 1B. FIGS. 1A and 1B are diagrams illustrating a configuration of a display apparatus 100 as the display apparatus according to the first embodiment of the present technology. Specifically, FIG. 1A is a plan configuration diagram of the display apparatus 100, and FIG. 1B is a schematic overall configuration diagram of the display apparatus 100.

The display apparatus 100 includes at least an image display element 41, a collimating optical system 51, a light guide plate 31, a first optical element 11 disposed on the light guide plate 31, and multiple second optical elements 21 disposed on the light guide plate 31. In FIGS. 1A and 1B, the collimating optical system 51 is disposed on the left side of the light guide plate 31, the first optical element 11 is formed on a side close to the collimating optical system 51, and the multiple second optical elements 21 are formed on a side far from the collimating optical system 51. That is, in FIGS. 1A and 1B, the first optical element 11 and the multiple second optical elements 21 are formed in order from the left side of the display apparatus 100 (light guide plate 31).

In the display apparatus 100, as illustrated in FIG. 1B, the first optical element 11 and the multiple second optical elements 21 are formed on a surface of the light guide plate 31 opposite to a pupil 500-1 (eyeball 500).

The image display element 41 included in the display apparatus 100 is desirably, for example, a high output self-light emitting panel. In addition, the image display element 41 such as LCoS and DLP and an illumination optical system may be included. A video signal (video display light L1000) output from the image display element 41 is collimated by the collimating optical system 51. The collimated light (image display light L2000) enters the light guide plate 31 from the first optical element 11 (for example, a hologram) provided on the light guide plate 31 on the side close to the collimating optical system (video display light L3000). A collimation group (multiple collimated light beams) guided in the light guide plate 31 is extracted from the multiple second optical elements 21 (for example, a hologram of which examples include a surface relief hologram, a volume hologram, and the like) on the side far from the collimating optical system 51 to the outside of the light guide plate, and causes video display light L4000 to be incident on the pupil 500-1 (eyeball 500) of a human (user). As a result, the user (wearer wearing the display apparatus 100) can view a video (video signal) through the light guide plate 31 that is transparent in appearance.

The display apparatus 100 as a display apparatus according to the first embodiment of the present technology will be described in more detail with reference to FIGS. 2A, 2B, 3A, and 3B.

Figure 2A:
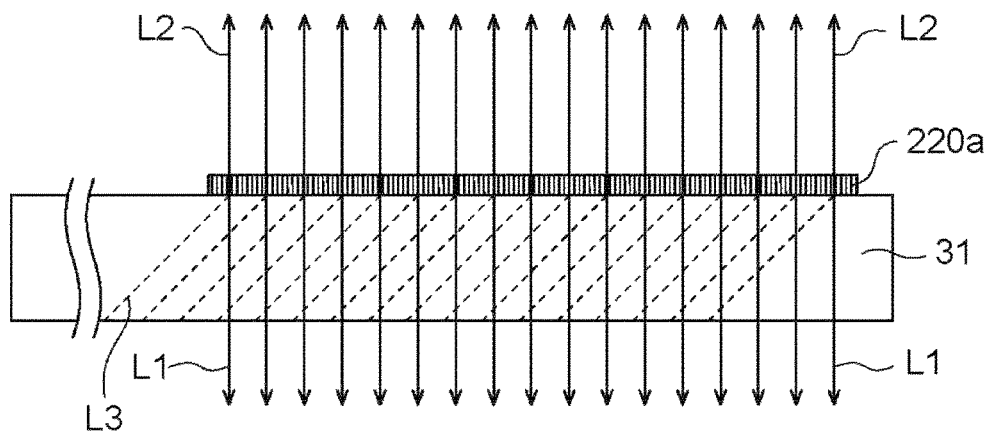
FIGS. 2A and 2B are diagrams for describing an example of a configuration and operation of multiple second optical elements (second optical element group) included in the display apparatus according to the first embodiment to which the present technology is applied.
Figure 2B:
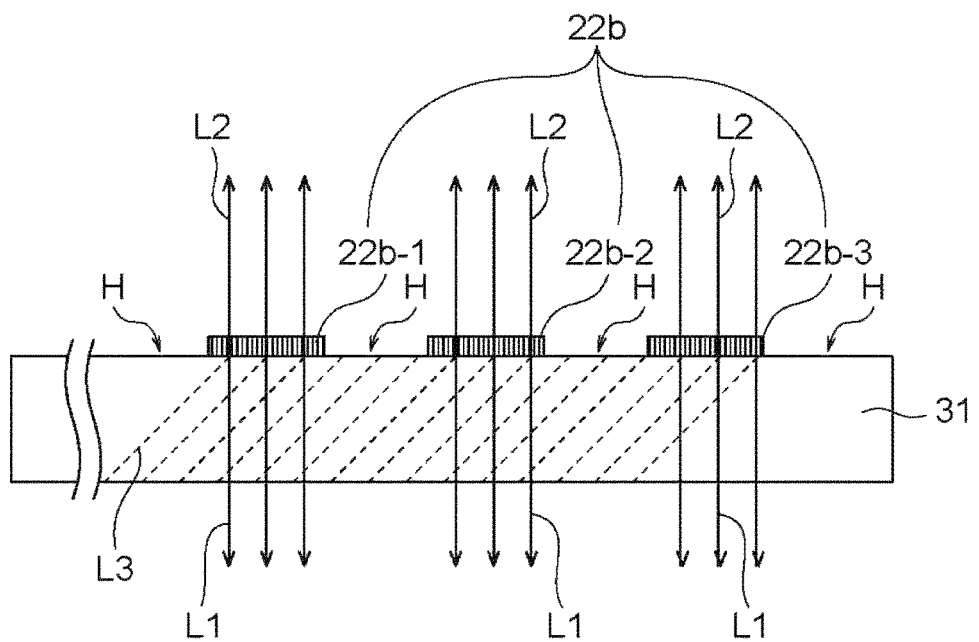

FIGS. 2A and 2B are diagrams for describing a configuration and operation of multiple second optical elements 22b included in the display apparatus 100. In FIG. 2A, one optical element 220a is disposed on the surface of the light guide plate 31 on a front surface side (opposite side of the pupil (not shown)). In FIG. 2B, second optical elements 22b-1, 22b-2, and 22b-3 as the multiple (three) second optical elements 22b are disposed apart from each other on the surface of the light guide plate 31 on the front surface side (opposite side of the pupil (not shown)).

Figure 3B:
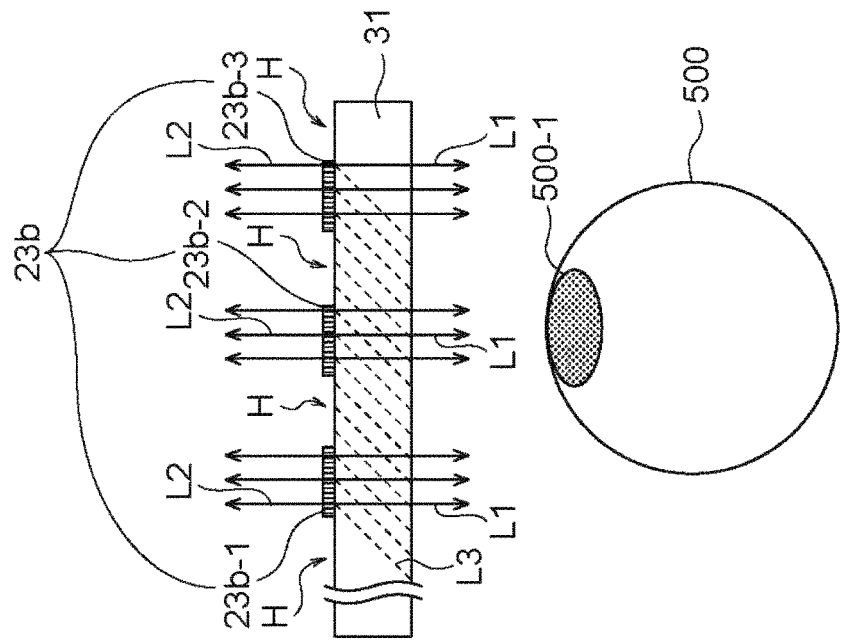
FIGS. 3A and 3B are diagrams for describing an example of a configuration and operation of the multiple second optical elements (second optical element group) included in the display apparatus according to the first embodiment to which the present technology is applied.
Figure 3A:
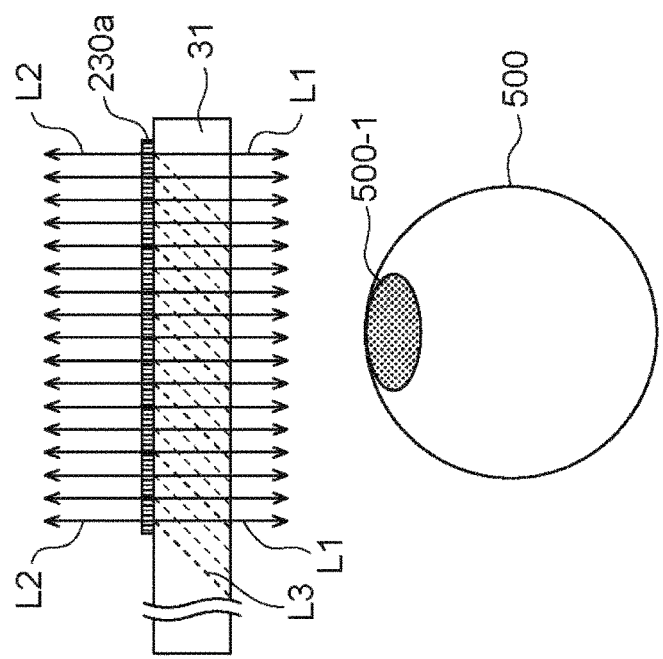

FIGS. 3A and 3B are diagrams for describing a configuration and operation of multiple second optical elements 23b included in the display apparatus 100. In FIG. 3A, one optical element 230a is disposed on the surface of the light guide plate 31 on a front surface side (opposite side of the pupil 500-1 (eyeball 500)). In FIG. 3B, second optical elements 23b-1, 23b-2, and 23b-3 as the multiple (three) second optical elements 23b are disposed apart from each other on the surface of the light guide plate 31 on the front surface side (opposite side of the pupil 500-1 (eyeball 500)).

FIGS. 2A, 2B, 3A, and 3B illustrate the multiple second optical elements 22b and 23b (for example, a hologram) on the side far from the collimating optical system 51. Each of the multiple second optical elements 22b and 23b has a divided configuration including a flat portion as compared with the optical elements 220a and 230a. Each of the second optical elements 22b-1, 22b-2, and 22b-3 constituting the multiple second optical elements 22b and the second optical elements 23b-1, 23b-2, and 23b-3 constituting the multiple second optical elements 23b may be configured to have a size of, for example, about φ2 mm or less in plan view. Light L1 traveling in a direction of the pupil and light L2 traveling in the opposite direction to the direction of the pupil by light L3 propagated by total reflection in the light guide plate are not emitted from a region where each of the second optical elements (for example, a hologram) 22b-1 to 22b-3 and 23b-1 to 23b-3 does not exist (a region H corresponding to a surface portion of the light guide plate 31 where the second optical element (hologram) is not formed). On the other hand, from a region where each of the second optical elements 22b-1, 22b-2, and 22b-3 and the second optical elements 23b-1, 23b-2, and 23b-3 exists (a region not corresponding to the surface portion of light guide plate 31 where the second optical element (hologram) is formed), the light L1 traveling in the direction of the pupil and the light L2 traveling in the opposite direction to the direction of the pupil by the light L3 propagated by total reflection in the light guide plate are emitted. This configuration can reduce light when viewed from other people and exert an effect of reducing the multiple second optical elements (for example, a hologram) at an eye portion of the wearer from appearing to be shining.

Furthermore, in a case where each of the second optical elements 22b-1, 22b-2, and 22b-3 and the second optical elements 23b-1, 23b-2, and 23b-3 include, for example, a surface relief hologram, the light guide plate 31 and the second optical elements 22b-1, 22b-2, and 22b-3 are preferably integrally molded by injection molding, and the light guide plate 31 and the second optical elements 23b-1, 23b-2, and 23b-3 are preferably integrally molded by injection molding. By integrally molding the light guide plate, it is possible to prevent an increase in the cost of the light guide plate and to achieve manufacturing of a low-cost display apparatus (image display apparatus).

Furthermore, each of the second optical elements 22b-1, 22b-2, and 22b-3 and the second optical elements 23b-1, 23b-2, and 23b-3 is, for example, a hologram, and the light incident on the pupil 500-1 (eyeball 500) from the hologram has a small light flux diameter of 2 mm or less, for example. Therefore, video signal light is condensed on the retina at a small spot regardless of a focus position of the wearer, and thus a focus-free effect is exhibited.

As described above, the contents described for the display apparatus according to the first embodiment (Example 1 of the display apparatus) of the present technology can be applied to the display apparatus according to second to tenth embodiments of the present technology described later unless there is a technical contradiction.

3. Second Embodiment (Example 2 of Display Apparatus)

A display apparatus according to the second embodiment (Example 2 of the display apparatus) of the present technology is a display apparatus including an image display element, a collimating optical system that collimates light emitted from the image display element, a light guide plate on which light emitted from the collimating optical system is incident and that totally reflects and guides the light being incident, a first optical element that is disposed on the light guide plate and introduces the light being incident into the light guide plate, and multiple second optical elements (a second optical element group) that are disposed on the light guide plate and emit light propagated by total reflection in the light guide plate to outside of the light guide plate. Then, in the display apparatus, each of the multiple second optical elements is a reflective or transmissive volume hologram. In the display apparatus according to the second embodiment (Example 2 of the display apparatus) of the present technology, the multiple second optical elements are preferably disposed apart from each other on the light guide plate. Furthermore, in the display apparatus according to the second embodiment of the present technology, the first optical element may also be a reflective or transmissive volume hologram.

Hereinafter, the display apparatus according to the second embodiment (Example 2 of the display apparatus) of the present technology will be specifically described with reference to FIGS. 4A, 4B, and 4C.

Figure 4A:
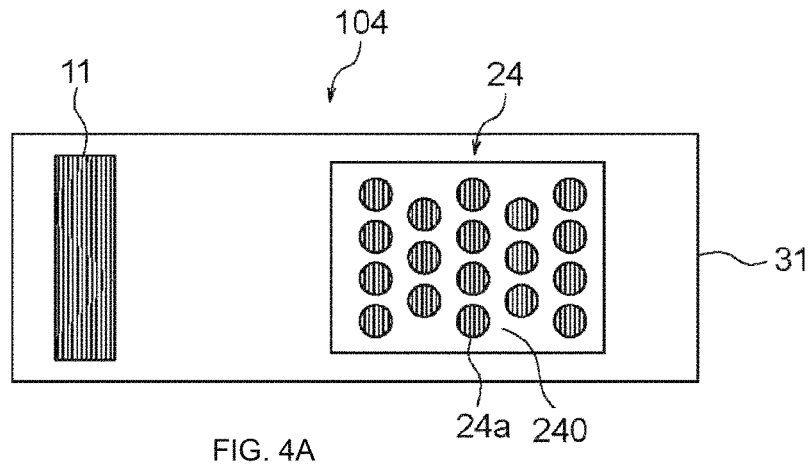
FIGS. 4A, 4B, and 4C are diagrams illustrating a configuration example of a display apparatus according to a second embodiment to which the present technology is applied, and is a diagram for describing a method of manufacturing the display apparatus according to the second embodiment to which the present technology is applied.
Figure 4B:
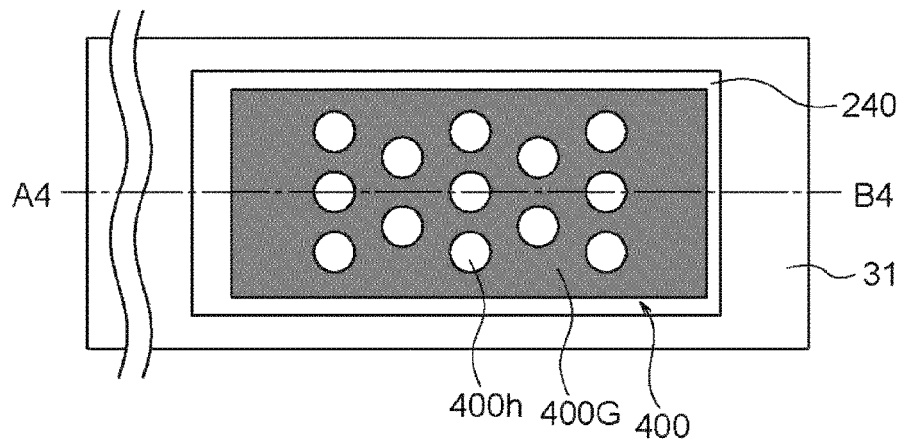
Figure 4C:
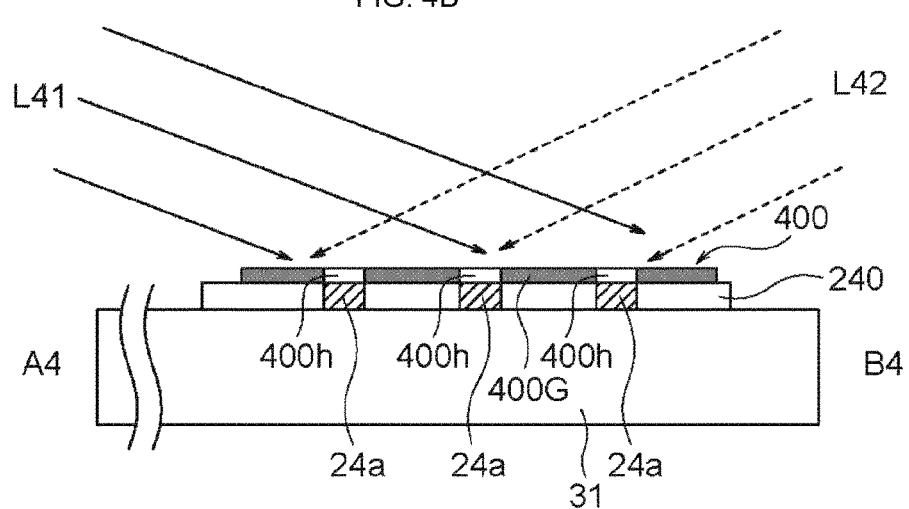

FIGS. 4A, 4B, and 4C are diagrams illustrating a configuration of a display apparatus 104 as the display apparatus according to the second embodiment of the present technology. Specifically, FIG. 4A is a plan configuration diagram of the display apparatus 104, and FIG. 4B is a diagram illustrating a part of the configuration of the display apparatus 104, and is also a diagram for describing a method of manufacturing the display apparatus 104.

The display apparatus 104 includes at least an image display element (not shown in FIGS. 4A, 4B, and 4C), a collimating optical system (not shown in FIGS. 4A, 4B, and 4C), a light guide plate 31, a first optical element 11 disposed on the light guide plate 31, and multiple second optical elements 24 disposed on the light guide plate 31. Although not in shown in FIGS. 4A, 4B, and 4C, the first optical element 11 is formed on a side close to the collimating optical system, and the multiple second optical elements 24 are formed on a side far from the collimating optical system. That is, in FIGS. 4A, 4B, and 4C (FIG. 4A), the first optical element 11 and the multiple second optical elements 24 are formed in order from the left side of the display apparatus 104 (light guide plate 31). Each of the multiple second optical elements 24 is a reflective or transmissive volume hologram.

In the display apparatus 104, the first optical element 11 and the multiple second optical elements 24 may be formed on the surface of the light guide plate 31 on the opposite side of a pupil side. Alternatively, as in a display apparatus according to the fourth embodiment of the present technology (Example 4 of the display apparatus) described later, the first optical element 11 and the multiple second optical elements 24 may be formed on the surface of the light guide plate 31 on the opposite side of the pupil side, and furthermore, the multiple second optical elements 24 may be formed on the surface of the light guide plate 31 on the pupil side.

As illustrated in FIGS. 4B and 4C, for example, a mask 400 is disposed on a photosensitive composition 240 for volume hologram recording including a photopolymer material. The mask 400 has multiple regions 400h. A hole (for example, a through hole) is formed in the region 400h, or the region 400h includes a material having a transmittance higher than a transmittance of a material constituting a region of the mask 400 other than the multiple regions 400h. Laser beams L41 and L42 emitted from different directions are applied to a region where the mask 400 is disposed, the laser beams L41 and L42 pass through only the portions of the multiple regions 400h, and an exposed hologram region (second optical element 24a) is formed in accordance with shapes of the multiple regions 400h (along the shapes of the multiple regions 400h). On the other hand, the laser beams L41 and L42 are not transmitted through a region 400G of the mask 400 other than the multiple regions 400h.

Since each of the multiple second optical elements 24 is a volume hologram, the display apparatus 104 can further reduce leakage light (for example, in FIGS. 2A and 2B, the light L2 traveling in the opposite direction to the direction of the pupil) to other than the wearer.

As described above, the contents described for the display apparatus according to the second embodiment (Example 2 of the display apparatus) of the present technology can be applied to the display apparatus according to the first embodiment of the present technology and also the display apparatus according to the third to tenth embodiments of the present technology described later unless there is a technical contradiction.

4. Third Embodiment (Example 3 of Display Apparatus)

A display apparatus according to the third embodiment (Example 3 of the display apparatus) of the present technology is a display apparatus including an image display element, a collimating optical system that collimates light emitted from the image display element, a light guide plate on which light emitted from the collimating optical system is incident and that totally reflects and guides the light being incident, and multiple second optical elements that are disposed on the light guide plate and emit light propagated by total reflection in the light guide plate to outside of the light guide plate. Then, in the display apparatus, a light guide plate incident portion included in the light guide plate introduces the light being incident into the light guide plate.

Hereinafter, the display apparatus according to the third embodiment (Example 3 of the display apparatus) of the present technology will be specifically described with reference to FIGS. 5A and 5B.

Figure 5A:
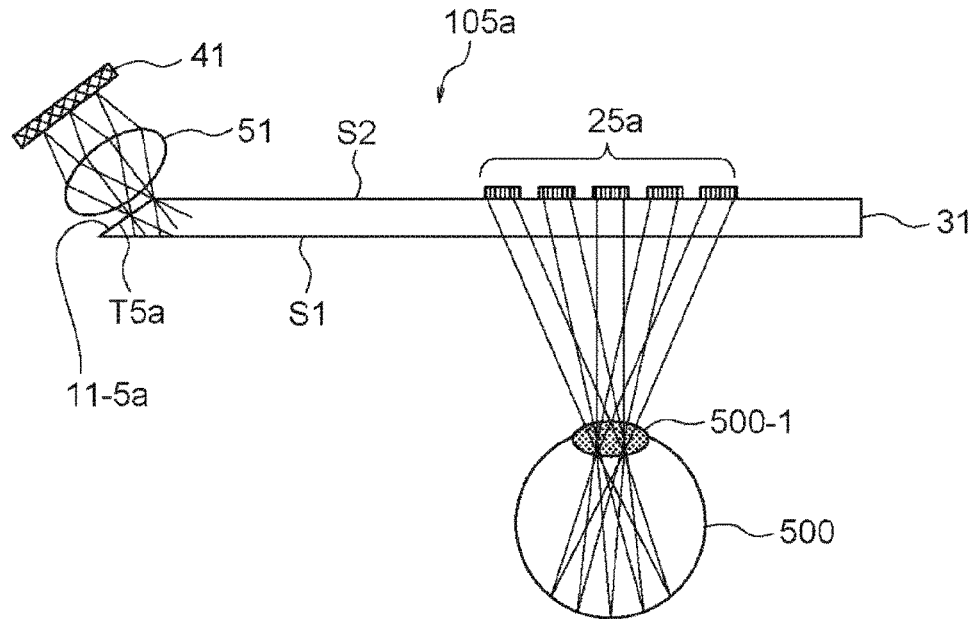
FIGS. 5A and 5B are diagrams illustrating a configuration example of a display apparatus according to a third embodiment to which the present technology is applied.
Figure 5B:
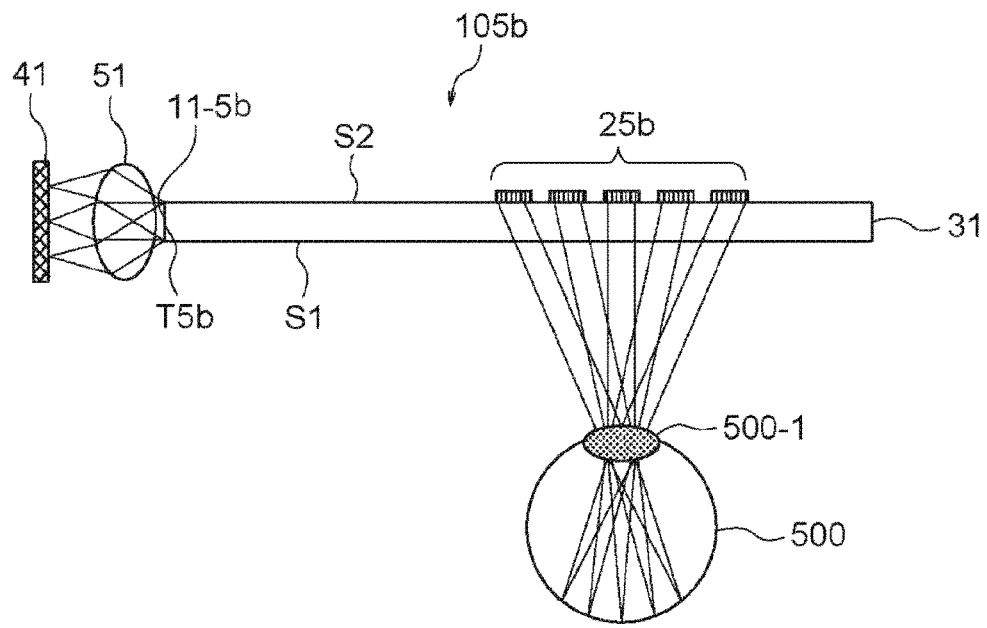

FIG. 5A is a schematic overall configuration diagram of a display apparatus 105a as the display apparatus according to the third embodiment of the present technology, and FIG. 5B is a schematic overall configuration diagram of a display apparatus 105b as the display apparatus according to the third embodiment of the present technology.

First, description will be made with reference to FIG. 5A. The display apparatus 105a includes at least an image display element 41, a collimating optical system 51, a light guide plate 31 including a light guide plate incident portion 11-5a, and multiple second optical elements 25a disposed on the light guide plate 31. In FIG. 5A, the collimating optical system 51 is disposed on the left side of the light guide plate 31 (on the left oblique upper side of a left end of the light guide plate 31 in FIG. 5A), the light guide plate incident portion 11-5a is formed on a side close to the collimating optical system 51, and the multiple second optical elements 25a are formed on a side far from the collimating optical system 51. That is, in FIG. 5A, the light guide plate incident portion 11-5a and the multiple second optical elements 25a are formed in order from the left side of the display apparatus 105a (light guide plate 31). By using the light guide plate incident portion 11-5a, a coupling efficiency of an incident portion can be increased, for example, the coupling efficiency can be made close to 100%. Note that a light transmitting member and/or a light reflecting member may be formed as the first optical element on the light guide plate incident portion 11-5a.

The light guide plate incident portion 11-5a is formed on a left end surface T5a of the light guide plate 31 connected to a surface S1 of the light guide plate 31 on the pupil side and a surface S2 of the light guide plate 31 opposite to the pupil side. As illustrated in FIG. 5A, a connection angle between the end surface T5a and the surface S2 is an obtuse angle in a sectional view, a connection angle between the end surface T5a and the surface S1 is an acute angle in a sectional view, and the end surface T5a is formed to extend obliquely downward to the left with the surface S2 as a start point and the surface S1 as an end point. Since the light guide plate incident portion 11-5a is formed along the end surface T5a, in a similar manner to the end surface T5a, the light guide plate incident portion is formed to extend obliquely downward to the left with the surface S2 as a start point and the surface S1 as an end point. Therefore, it can be said that the light guide plate incident portion 11-5a has a configuration including the end surface T5a, or includes the end surface T5a.

In the display apparatus 105a, the second optical elements 25a are formed on the surface S2 of the light guide plate 31 opposite to the pupil side. Note that, although not shown, as in a display apparatus according to the fourth embodiment of the present technology (Example 4 of the display apparatus) described later, the multiple second optical elements 25a may be formed on the surface S2 of the light guide plate 31 on the opposite side of the pupil side, and furthermore, the multiple second optical elements 25a may be formed on the surface S1 of the light guide plate 31 on the pupil side.

Next, description will be made with reference to FIG. 5B. The display apparatus 105b includes at least an image display element 41, a collimating optical system 51, a light guide plate 31 including a light guide plate incident portion 11-5b, and multiple second optical elements 25b disposed on the light guide plate 31. In FIG. 5B, the collimating optical system 51 is disposed on the left side of the light guide plate 31 (on the left side of the left end of the light guide plate 31 in FIG. 5B), the light guide plate incident portion 11-5b is formed on a side close to the collimating optical system 51, and the multiple second optical elements 25a are formed on a side far from the collimating optical system 51. That is, in FIG. 5B, the light guide plate incident portion 11-5b and the multiple second optical elements 25b are formed in order from the left side of the display apparatus 105b (light guide plate 31). By using the light guide plate incident portion 11-5b, a coupling efficiency of an incident portion can be increased, for example, the coupling efficiency can be made close to 100%. Note that a light transmitting member and/or a light reflecting member may be formed as the first optical element on the light guide plate incident portion 11-5b.

The light guide plate incident portion 11-5b is formed on a left end surface T5b of the light guide plate 31 connected to the surface S1 of the light guide plate 31 on the pupil side and the surface S2 of the light guide plate 31 opposite to the pupil side. As illustrated in FIG. 5B, a connection angle between the end surface T5b and the surface S2 is substantially perpendicular (approximately 90 degrees) in a sectional view, a connection angle between the end surface T5b and the surface S1 is substantially perpendicular (approximately 90 degrees) in a sectional view, and the end surface T5b is formed to extend substantially perpendicularly downward to the left with the surface S2 as a start point and the surface S1 as an end point. Since the light guide plate incident portion 11-5b is formed along the end surface T5b, in a similar manner to the end surface T5b, the light guide plate incident portion is formed to extend substantially perpendicularly downward to the left with the surface S2 as a start point and the surface S1 as an end point. Therefore, it can be said that the light guide plate incident portion 11-5b has a configuration including the end surface T5b, or includes the end surface T5b.

In the display apparatus 105b, the second optical elements 25a are formed on the surface S2 of the light guide plate 31 opposite to the pupil side. Note that, although not shown, as in a display apparatus according to the fourth embodiment of the present technology (Example 4 of the display apparatus) described later, the multiple second optical elements 25b may be formed on the surface S2 of the light guide plate 31 on the opposite side of the pupil side, and furthermore, the multiple second optical elements 25b may be formed on the surface S1 of the light guide plate 31 on the pupil side.

As described above, the contents described for the display apparatus according to the third embodiment (Example 3 of the display apparatus) of the present technology can be applied to the display apparatus according to the first and second embodiments of the present technology and also the display apparatus according to the fourth to tenth embodiments of the present technology described later unless there is a technical contradiction.

5. Fourth Embodiment (Example 4 of Display Apparatus)

A display apparatus according to the fourth embodiment (Example 4 of the display apparatus) of the present technology is a display apparatus including an image display element, a collimating optical system that collimates light emitted from the image display element, a light guide plate on which light emitted from the collimating optical system is incident and that totally reflects and guides the light being incident, a first optical element that is disposed on the light guide plate and introduces the light being incident into the light guide plate, and multiple second optical elements that are disposed on the light guide plate and emit light propagated by total reflection in the light guide plate to outside of the light guide plate. Then, in the display apparatus, the light guide plate has at least a first surface and a second surface, the first surface is disposed on the pupil side, the second surface is disposed on the opposite side of the pupil side, the multiple second optical elements are disposed on the first surface, and the multiple second optical elements are disposed on the second surface. In the display apparatus according to the fourth embodiment (Example 4 of the display apparatus) of the present technology, the multiple second optical elements disposed on the first surface and the multiple second optical elements disposed on the second surface preferably face each other.

Hereinafter, the display apparatus according to the fourth embodiment (Example 4 of the display apparatus) of the present technology will be specifically described with reference to FIG. 6.

Figure 6:
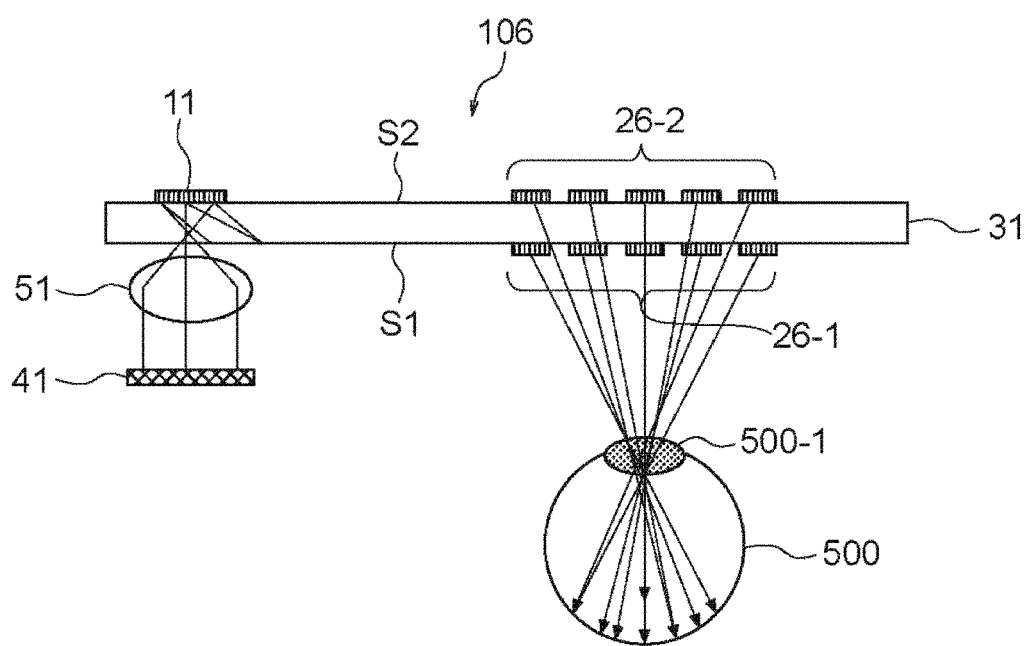
FIG. 6 is a diagram illustrating a configuration example of a display apparatus according to a fourth embodiment to which the present technology is applied.

FIG. 6 is a schematic overall configuration diagram of a configuration of a display apparatus 106 as the display apparatus according to the fourth embodiment of the present technology.

The display apparatus 106 includes at least an image display element 41, a collimating optical system 51, a light guide plate 31, a first optical element 11 disposed on the light guide plate 31, and multiple second optical elements 26-1 and 26-2 disposed on the light guide plate 31. In FIG. 6, the collimating optical system 51 is disposed on the left side of the light guide plate 31, the first optical element 11 is formed on a side close to the collimating optical system 51, and the multiple second optical elements 26-1 and 26-2 are formed on a side far from the collimating optical system 51. That is, in FIG. 6, the first optical element 11 and the multiple second optical elements 21 are formed in order from the left side of the display apparatus 100 (light guide plate 31).

In the display apparatus 106, as illustrated in FIG. 6, the first optical element 11 and the multiple second optical elements 26-2 are formed on the surface S2 of the light guide plate 31 opposite to the pupil 500-1 (eyeball 500), and the multiple second optical elements 26-1 are formed on the surface S1 of the light guide plate 31 on the side of the pupil 500-1 (eyeball 500). That is, in FIG. 6, the multiple second optical elements 26-1 and 26-2 are formed to face each other with the light guide plate 31 interposed therebetween. Note that the multiple second optical elements 26-1 and 26-2 are only required to be formed on each of the surface S1 and the surface S2 of the light guide plate 31, and need not be formed to face each other.

The display apparatus 106 further reduces unevenness of an angle of view and further reduce leakage light (for example, in FIGS. 2A and 2B, the light L2 traveling in the opposite direction to the direction of the pupil) to other than the wearer (user).

As described above, the contents described for the display apparatus according to the fourth embodiment (Example 4 of the display apparatus) of the present technology can be applied to the display apparatus according to the first to third embodiments of the present technology and also the display apparatus according to the fifth to tenth embodiments of the present technology described later unless there is a technical contradiction.

6. Fifth Embodiment (Example 5 of Display Apparatus)

A display apparatus according to the fifth embodiment (Example 5 of the display apparatus) of the present technology is a display apparatus including an image display element, a collimating optical system that collimates light emitted from the image display element, a light guide plate on which light emitted from the collimating optical system is incident and that totally reflects and guides the light being incident, a first optical element that is disposed on the light guide plate and introduces the light being incident into the light guide plate, and multiple second optical elements that are disposed on the light guide plate and emit light propagated by total reflection in the light guide plate to outside of the light guide plate.

In the display apparatus, the light guide plate has at least a first surface and a second surface, the first surface is disposed on the pupil side, the second surface is disposed on the opposite side of the pupil side, the multiple second optical elements are disposed on the first side, and the multiple second optical elements are disposed on the second side, an amount of transmitted diffracted light transmitted through the second optical elements disposed on the first surface may be larger than an amount of reflected diffracted light reflected by the second optical elements disposed on the first surface, an amount of transmitted diffracted light transmitted through the second optical elements disposed on the second surface may be smaller than an amount of reflected diffracted light reflected by the second optical elements disposed on the second surface, and the amount of transmitted diffracted light transmitted through the second optical elements disposed on the first surface may be larger than the amount of reflected diffracted light reflected by the second optical elements disposed on the first surface, and the amount of transmitted diffracted light transmitted through the second optical elements disposed on the second surface may be smaller than the amount of reflected diffracted light reflected by the second optical elements disposed on the second surface.

Hereinafter, the display apparatus according to the fifth embodiment (Example 5 of the display apparatus) of the present technology will be specifically described with reference to FIG. 7.

Figure 7:
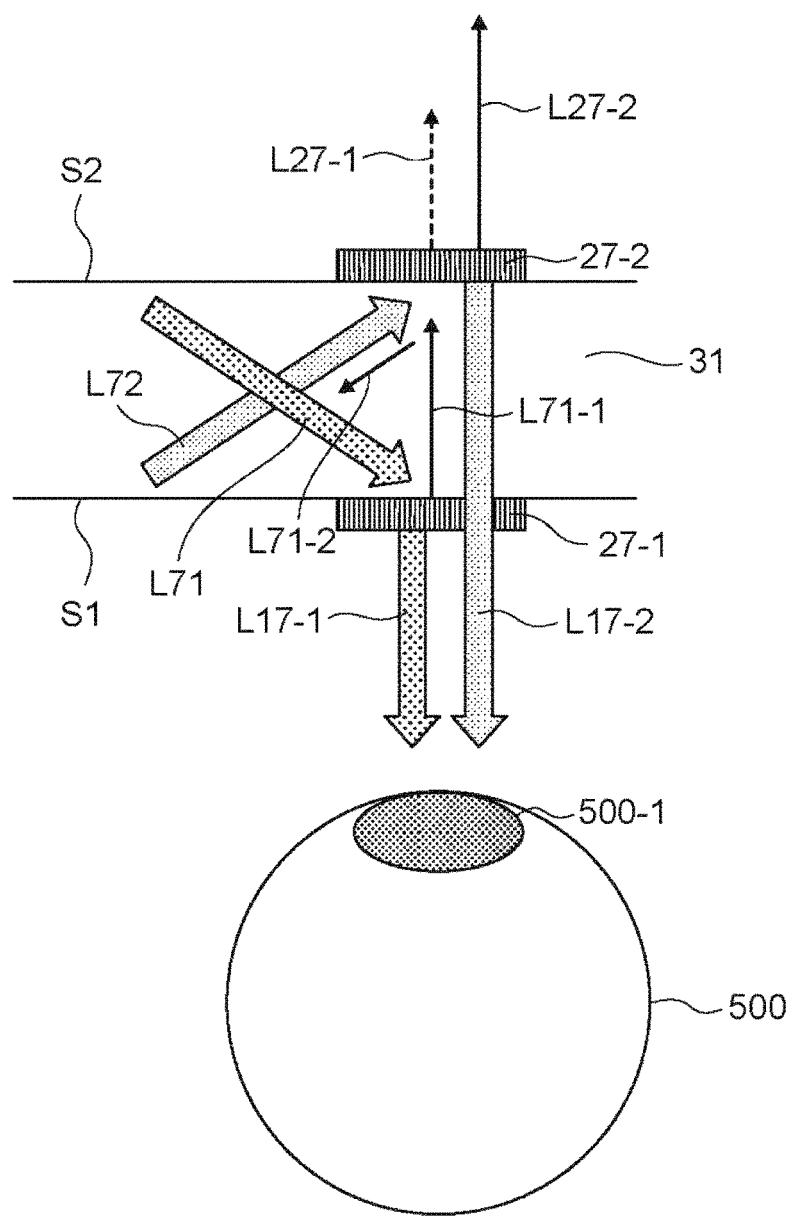
FIG. 7 is a diagram illustrating a configuration example of a display apparatus according to a fifth embodiment to which the present technology is applied.

FIG. 7 is a diagram illustrating a part of a configuration of the display apparatus according to the fifth embodiment to which the present technology is applied.

In the display apparatus according to the fifth embodiment of the present technology, as illustrated in FIG. 7, a second optical element 27-2 is formed on the surface S2 of the light guide plate 31 opposite to the pupil 500-1 (eyeball 500), a second optical element 27-1 is formed on the surface S1 of the light guide plate 31 on the side of the pupil 500-1 (eyeball 500). Meanwhile, the display apparatus according to the fifth embodiment of the present technology may include the multiple second optical elements 27-1 and 27-2, and have, for example, a configuration similar to the configuration of the display 106 as the display apparatus according to the fourth embodiment of the present technology.

The second optical element 27-2 (which may be referred to as a surface hologram) reflects angle-of-view light L72 propagating through the light guide plate 31 to generate the reflected diffracted light L17-2, and causes the reflected diffracted light L17-2 to enter the pupil 500-1 (eyeball 500). Then, the second optical element 27-2 transmits the angle-of-view light L72, generates the transmitted diffracted light L27-2, and emits the transmitted diffracted light to the opposite side of the pupil 500-1 (eyeball 500) (other than the wearer). The second optical element 27-2 can make a light amount of the reflected diffracted light L17-2 larger than a light amount of the transmitted diffracted light L27-2. Since the second optical element 27-2 is disposed, leakage light to other than the wearer can be reduced.

On the other hand, the second optical element 27-1 (which may be referred to as a back surface hologram) transmits the angle-of-view light L71 propagating in the light guide plate 31 to generate the transmitted diffracted light L17-1 (which includes diffracted light in which the angle-of-view light L71 is reflected by the second optical element 27-1 (reflected diffracted light L71-1), further reflected by the second optical element 27-2 (diffracted light L71-2), and transmitted through the second optical element 27-1), and causes the transmitted diffracted light L17-1 to be incident on the pupil 500-1 (eyeball 500). Then, the second optical element 27-1 reflects the angle-of-view light L71 to generate the reflected diffracted light L71-1, transmits through the second optical element 27-2, and emits the reflected diffracted light L71-1 (the diffracted light L27-1 transmitted through the second optical element 27-2) to the opposite side of the pupil 500-1 (eyeball 500) (other than the wearer). The second optical element 27-1 can make a light amount of the transmitted diffracted light L17-1 larger than a light amount of the reflected diffracted light L71-1. Since the second optical element 27-1 is disposed, leakage light to other than the wearer can be reduced.

The display apparatus according to the fifth embodiment of the present technology further reduce leakage light (for example, in FIGS. 2A and 2B, the light L2 traveling in the opposite direction to the direction of the pupil) to other than the wearer (user).

As described above, the contents described for the display apparatus according to the fifth embodiment (Example 5 of the display apparatus) of the present technology can be applied to the display apparatus according to the first to fourth embodiments of the present technology and also the display apparatus according to the sixth to tenth embodiments of the present technology described later unless there is a technical contradiction.

7. Sixth Embodiment (Example 6 of Display Apparatus)

A display apparatus according to the sixth embodiment (Example 6 of the display apparatus) of the present technology is a display apparatus including an image display element, a collimating optical system that collimates light emitted from the image display element, a light guide plate on which light emitted from the collimating optical system is incident and that totally reflects and guides the light being incident, a first optical element that is disposed on the light guide plate and introduces the light being incident into the light guide plate, and multiple second optical elements that are disposed on the light guide plate and emit light propagated by total reflection in the light guide plate to outside of the light guide plate.

Then, in the display apparatus, diffraction efficiency of each of the second optical elements of the multiple second optical elements may increase farther away from the first optical element, and then, gradually, diffraction efficiency of each second optical element of the multiple second optical elements may increase farther away from the first optical element.

Hereinafter, the display apparatus according to the sixth embodiment (Example 6 of the display apparatus) of the present technology will be specifically described with reference to FIG. 8.

Figure 8:
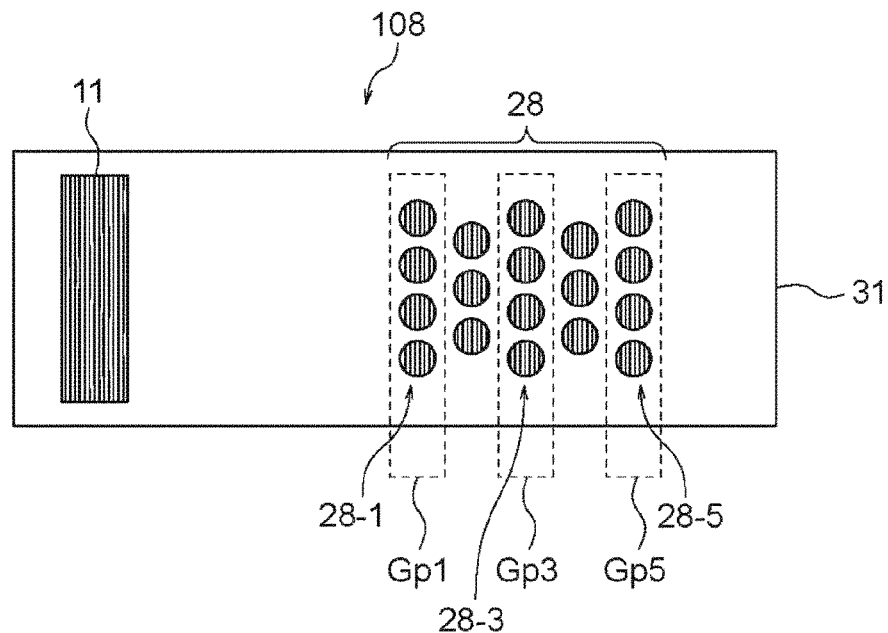
FIG. 8 is a diagram illustrating a configuration example of a display apparatus according to a sixth embodiment to which the present technology is applied.

FIG. 8 is a plan configuration diagram of a display apparatus 108 as the display apparatus according to the sixth embodiment of the present technology.

The display apparatus 108 includes at least an image display element (not shown in FIG. 8), a collimating optical system (not shown in FIG. 8), a light guide plate 31, a first optical element 11 disposed on the light guide plate 31, and multiple second optical elements 28 disposed on the light guide plate 31. Although not in shown in FIG. 8, the first optical element 11 is formed on a side close to the collimating optical system, and the multiple second optical elements 28 are formed on a side far from the collimating optical system. That is, in FIG. 8, the first optical element 11 and the multiple second optical elements 28 are formed in order from the left side of the display apparatus 108 (light guide plate 31).

In the display apparatus 108, the first optical element 11 and the multiple second optical elements 28 may be formed on the surface of the light guide plate 31 on the opposite side of a pupil side. Alternatively, as in a display apparatus according to the fourth embodiment of the present technology (Example 4 of the display apparatus) described above, the first optical element 11 and the multiple second optical elements 28 may be formed on the surface of the light guide plate 31 on the opposite side of the pupil side, and furthermore, the multiple second optical elements 28 may be formed on the surface of the light guide plate 31 on the pupil side.

The multiple second optical elements 28 include, in order from the first optical element 11 (from the left side to the right side in FIG. 8), a first region Gp1 including multiple second optical elements 28-1, a third region Gp3 including multiple second optical elements 28-3, and a fifth region Gp5 including multiple second optical elements 28-5.

In the display apparatus 108, a diffraction efficiency ($\eta_{Gp5}$) of each of the second optical elements of the multiple second optical elements 28-5 belonging to the fifth region Gp5 are larger than a diffraction efficiency ($\eta_{Gp3}$) of each of the second optical elements of the multiple second optical elements 28-3 belonging to the third region Gp3, and the diffraction efficiency ($\eta_{Gp3}$) of each of the second optical elements of the multiple second optical elements 28-3 belonging to the third region Gp3 is larger than a diffraction efficiency ($\eta_{Gp1}$) of each of the second optical elements of the multiple second optical elements 28-1 belonging to the first region Gp1.

That is, the following formula (1) is established, and diffraction efficiency of each of the second optical elements of the multiple second optical elements 28 increases farther away from the first optical element 11.

$$\eta_{Gp1}(\text{diffraction efficiency in first region } Gp1) < \eta_{Gp3}$$
$$(\text{diffraction efficiency in third region } Gp3) < \eta_{Gp5}$$
$$(\text{diffraction efficiency in fifth region } Gp5) \quad (1)$$

The display apparatus 108 can further reduce a luminance change, a light amount difference, and unevenness when eyebox, pupil movement, and a distance between pupils change.

As described above, the contents described for the display apparatus according to the sixth embodiment (Example 6 of the display apparatus) of the present technology can be applied to the display apparatus according to the first to fifth embodiments of the present technology and also the display apparatus according to the seventh to tenth embodiments of the present technology described later unless there is a technical contradiction.

8. Seventh Embodiment (Example 7 of Display Apparatus)

A display apparatus according to the seventh embodiment (Example 7 of the display apparatus) of the present technology is a display apparatus including an image display element, a collimating optical system that collimates light emitted from the image display element, a light guide plate on which light emitted from the collimating optical system is incident and that totally reflects and guides the light being incident, a first optical element that is disposed on the light guide plate and introduces the light being incident into the light guide plate, and multiple second optical elements that are disposed on the light guide plate and emit light propagated by total reflection in the light guide plate to outside of the light guide plate.

In the display apparatus, the distance between each of the second optical elements of the multiple second optical elements and the second optical element adjacent to each of the second optical elements of the multiple second optical elements may decrease farther away from the first optical element, and then, gradually, the distance between each of the second optical elements of the multiple second optical elements and the second optical element adjacent to each of the second optical elements of the multiple second optical elements may decrease farther away from the first optical element, the ratio of the area in plan view of each of the second optical elements of the multiple second optical elements to the area in plan view of the light guide plate between each of the second optical elements of the multiple second optical elements and the second optical element adjacent to each of the second optical elements of the multiple second optical elements may increase farther away from the first optical element, and then, gradually, the ratio of the area in plan view of each of the second optical elements of the multiple second optical elements to the area in plan view of the light guide plate between each of the second optical elements of the multiple second optical elements and the second optical element adjacent to each of the second optical elements of the multiple second optical elements may increase farther away from the first optical element, and the distance between each of the second optical elements of the multiple second optical elements and the second optical element adjacent to each of the second optical elements of the multiple second optical elements may decrease farther away from the first optical element, and the ratio in plan view of the area of each of the second optical elements of the multiple second optical elements to the area in plan view of the light guide plate between each of the second optical elements of the multiple second optical elements and the second optical element adjacent to each of the second optical elements of the multiple second optical elements may increase farther away from the first optical element, and then, gradually, the distance between each of the second optical elements of the multiple second optical elements and the second optical element adjacent to each of the second optical elements of the multiple second optical elements may increase farther away from the first optical element, and also gradually, the ratio in plan view of the area of each second optical element of the multiple second optical elements to the area in plan view of the light guide plate between each of the second optical elements of the multiple second optical elements and the second optical element adjacent to each of the second optical elements of the multiple second optical elements may increase farther away from the first optical element.

Hereinafter, the display apparatus according to the seventh embodiment (Example 7 of the display apparatus) of the present technology will be specifically described with reference to FIGS. 9 and 10.

Figure 9:
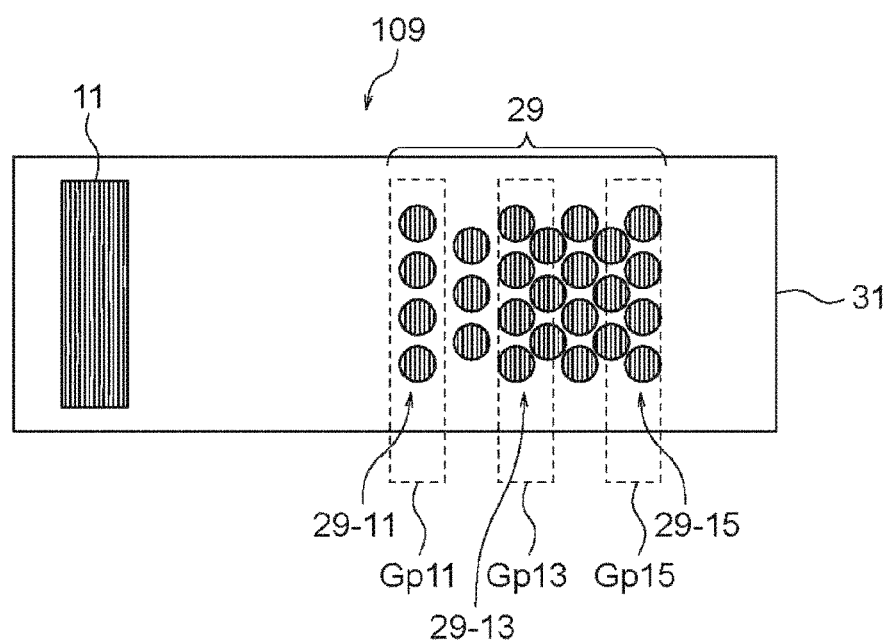
FIG. 9 is a diagram illustrating a configuration example of a display apparatus according to a seventh embodiment to which the present technology is applied.
Figure 10:
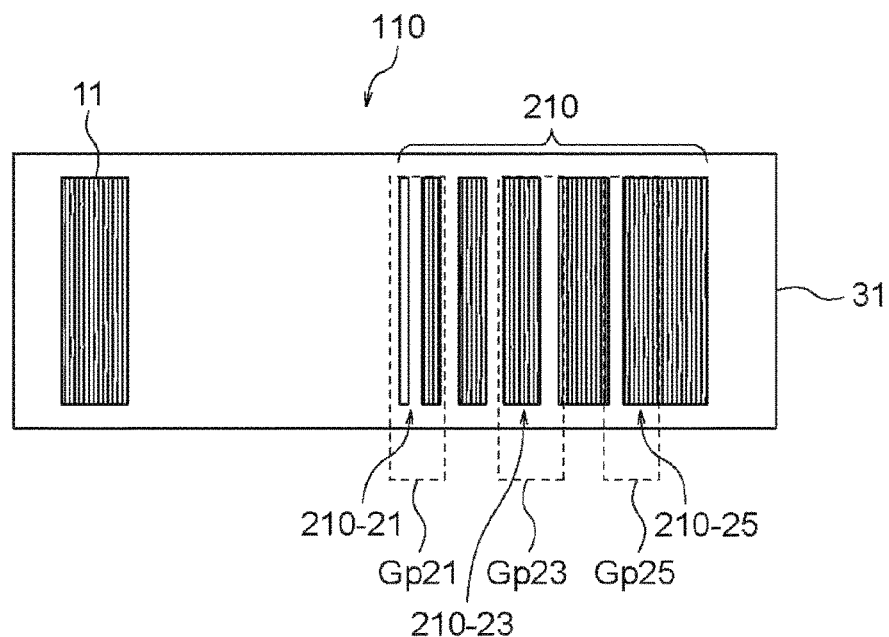
FIG. 10 is a diagram illustrating a configuration example of the display apparatus according to the seventh embodiment to which the present technology is applied.

FIG. 9 is a plan configuration diagram of a display apparatus 109 as the display apparatus according to the seventh embodiment of the present technology, and FIG. 10 is a plan configuration diagram of a display apparatus 110 as the display apparatus according to the seventh embodiment of the present technology.

First, the display apparatus according to the seventh embodiment of the present technology will be described with reference to FIG. 9.

The display apparatus 109 includes at least an image display element (not shown in FIG. 9), a collimating optical system (not shown in FIG. 9), a light guide plate 31, a first optical element 11 disposed on the light guide plate 31, and multiple second optical elements 29 disposed on the light guide plate 31.

As illustrated in FIG. 9, each of the second optical elements of the multiple second optical elements 29 has a dot shape (circular shape or point shape) in plan view from a front surface of the light guide plate. In FIG. 9, each of the second optical elements of the multiple second optical elements 29 has a dot shape (circular shape or point shape) in plan view from the front surface of the light guide plate surface, the dot shape having substantially the same area.

Although not in shown in FIG. 9, the first optical element 11 is formed on a side close to the collimating optical system, and the multiple second optical elements 29 is formed on a side far from the collimating optical system. That is, in FIG. 9, the first optical element 11 and the multiple second optical elements 29 are formed in order from the left side of the display apparatus 109 (light guide plate 31).

In the display apparatus 109, the first optical element 11 and the multiple second optical elements 29 may be formed on the surface of the light guide plate 31 on the opposite side of a pupil side. Alternatively, as in a display apparatus according to the fourth embodiment of the present technology (Example 4 of the display apparatus) described above, the first optical element 11 and the multiple second optical elements 29 may be formed on the surface of the light guide plate 31 on the opposite side of the pupil side, and furthermore, the multiple second optical elements 29 may be formed on the surface of the light guide plate 31 on the pupil side.

The multiple second optical elements 29 include, in order from the first optical element 11 (from the left side to the right side in FIG. 9), a first region Gp11 including multiple second optical elements 29-11, a third region Gp13 including multiple second optical elements 29-13, and a fifth region Gp15 including multiple second optical elements 29-15.

In the display apparatus 109, a distance ($d_{G15}$) between each of the second optical elements of the multiple second optical elements 29-15 belonging to the fifth region Gp15 and the second optical element adjacent to each of the second optical elements of the multiple second optical elements 29-15 is smaller than a distance ($d_{G13}$) between each of the optical elements of the multiple second optical elements 29-13 belonging to the third region Gp13 and the second optical element adjacent to each of the second optical elements of the multiple second optical elements 29-13. The distance ($d_{G13}$) between each of the optical elements of the multiple second optical elements 29-13 belonging to the third region Gp13 and the second optical element adjacent to each of the second optical elements of the multiple second optical elements 29-13 is smaller than a distance (dm) between each of the second optical elements of the multiple second optical elements 29-11 belonging to the first region Gp11 and the second optical element adjacent to each of the second optical elements of the multiple second optical elements 29-11.

That is, the following formula (2) is established, and the distance between each of the second optical elements of the multiple second optical elements 29 and the second optical element adjacent to each of the second optical elements of the multiple second optical elements 29 decreases farther away from the first optical element 11.

$$d_{G11} \text{ (distance in first region } Gp11) > d_{G13} \text{ (distance in third region } Gp13) > d_{G15} \text{ (distance in fifth region } Gp15) \quad (2)$$

In addition, in the display apparatus 109, a ratio (Ratio$_{Gp15}$) of an area in plan view of each of the second optical elements of the multiple second optical elements 29-15 belonging to a fifth region Gp15 to an area in plan view of the light guide plate 31 between each of the second optical elements of the multiple second optical elements 29-15 and the second optical element adjacent to each of the second optical elements of the multiple second optical elements 29-15 is larger than a ratio (Ratio$_{Gp13}$) of an area in plan view of each of the second optical elements of the multiple second optical elements 29-13 belonging to the third region Gp13 to an area in plan view of the light guide plate 31 between each of the second optical elements of the multiple second optical elements 29-13 and the second optical element adjacent to each of the second optical elements of the multiple second optical elements 29-13. A ratio (Ratio$_{Gp13}$) of an area in a plan view of each of the second optical elements of the multiple second optical elements 29-13 belonging to the third region Gp13 to an area in plan view of the light guide plate 31 between each of the second optical elements of the multiple second optical elements 29-13 and the second optical element adjacent to each of the second optical elements of the multiple second optical elements 29-13 is larger than a ratio (Ratio$_{Gp11}$) of an area of each of the second optical elements of the multiple second optical elements 29-11 belonging to the first region Gp11 to an area in plan view of the light guide plate 31 between each of the second optical elements of the multiple second optical elements 29-11 and the second optical element adjacent to each of the second optical elements of the multiple second optical elements 29-11.

That is, the following formula (3) is established, and the ratio of the area in plan view of each of the second optical elements of the multiple second optical elements 29 to the area in plan view of the light guide plate 31 between each of the second optical elements of the multiple second optical elements 29 and the second optical element adjacent to each of the second optical elements of the multiple second optical elements 29 increases farther away from the first optical element 11.

$$\text{Ratio}_{Gp11} \text{ (area ratio in first region } Gp11) < \text{Ratio}_{Gp13} \text{ (area ratio in third region } Gp13) < \text{Ratio}_{Gp15} \text{ (area ratio in fifth region } Gp15) \quad (3)$$

Next, the display apparatus according to the seventh embodiment of the present technology will be described with reference to FIG. 10.

The display apparatus 110 includes at least an image display element (not shown in FIG. 10), a collimating optical system (not shown in FIG. 10), a light guide plate 31, a first optical element 11 disposed on the light guide plate 31, and multiple second optical elements 210 disposed on the light guide plate 31.

As illustrated in FIG. 10, each of the second optical elements of the multiple second optical elements 210 has a rectangular shape in plan view from the front surface of the light guide plate. In FIG. 10, a length of a long side (a length in the up and down directions in FIG. 10) of each of the second optical elements of the multiple second optical elements 210 is substantially constant, but a length of a short side (a length in the left and right directions in FIG. 10) of each of the second optical elements of the multiple second optical elements 210 increases farther away from the first optical element 11.

Although not in shown in FIG. 10, the first optical element 11 is formed on a side close to the collimating optical system, and the multiple second optical elements 210 is formed on a side far from the collimating optical system. That is, in FIG. 10, the first optical element 11 and the multiple second optical elements 210 are formed in order from the left side of the display apparatus 110 (light guide plate 31).

In the display apparatus 110, the first optical element 11 and the multiple second optical elements 210 may be formed on the surface of the light guide plate 31 on the opposite side of a pupil side. Alternatively, as in a display apparatus according to the fourth embodiment of the present technology (Example 4 of the display apparatus) described above, the first optical element 11 and the multiple second optical elements 210 may be formed on the surface of the light guide plate 31 on the opposite side of the pupil side, and furthermore, the multiple second optical elements 210 may be formed on the surface of the light guide plate 31 on the pupil side.

The multiple second optical elements 210 includes, in order from the first optical element 11 (from the left side to the right side in FIG. 10), a first region Gp21 including multiple second optical elements 210-21, a third region Gp23 including multiple second optical elements 29-23, and a fifth region Gp25 including multiple second optical elements 29-25.

In the display apparatus 110, a distance ($d_{Gp25}$) between each of the second optical elements of the multiple second optical elements 210-25 belonging to the fifth region Gp25 and the second optical element adjacent to each of the second optical elements of the multiple second optical elements 29-15 is smaller than a distance ($d_{Gp23}$) between each of the optical elements of the multiple second optical elements 210-23 belonging to the third region Gp23 and the second optical element adjacent to each of the second optical elements of the multiple second optical elements 210-23. The distance ($d_{Gp23}$) between each of the optical elements of the multiple second optical elements 210-23 belonging to the third region Gp23 and the second optical element adjacent to each of the second optical elements of the multiple second optical elements 210-23 is smaller than a distance ($d_{Gp21}$) between each of the second optical elements of the multiple second optical elements 210-21 belonging to the first region Gp21 and the second optical element adjacent to each of the second optical elements of the multiple second optical elements 210-21.

That is, the following formula (4) is established, and the distance between each of the second optical elements of the multiple second optical elements 210 and the second optical element adjacent to each of the second optical elements of the multiple second optical elements 210 decreases farther away from the first optical element 11.

$d_{Gp21}$ (distance in first region $Gp21$)>$d_{Gp23}$ (distance in third region $Gp23$)>$d_{Gp25}$ (distance in fifth region $Gp25$)　　　(4)

In addition, in the display apparatus 110, a ratio (Ratio$_{G25}$) of an area in plan view of each of the second optical elements of the multiple second optical elements 210-25 belonging to a fifth region Gp25 to an area in plan view of the light guide plate 31 between each of the second optical elements of the multiple second optical elements 210-25 and the second optical element adjacent to each of the second optical elements of the multiple second optical elements 210-25 is larger than a ratio (Ratio$_{G23}$) of an area in plan view of each of the second optical elements of the multiple second optical elements 210-23 belonging to the third region Gp23 to an area in plan view of the light guide plate 31 between each of the second optical elements of the multiple second optical elements 210-23 and the second optical element adjacent to each of the second optical elements of the multiple second optical elements 210-23. A ratio (Ratio$_{G23}$) of an area in plan view of each of the second optical elements of the multiple second optical elements 210-23 belonging to the third region Gp23 to an area in plan view of the light guide plate 31 between each of the second optical elements of the multiple second optical elements 210-23 and the second optical element adjacent to each of the second optical elements of the multiple second optical elements 210-23 is larger than a ratio (Ratio$_{G21}$) of an area of each of the second optical elements of the multiple second optical elements 210-21 belonging to the first region Gp21 to an area in plan view of the light guide plate 31 between each of the second optical elements of the multiple second optical elements 210-21 and the second optical element adjacent to each of the second optical elements of the multiple second optical elements 210-21.

That is, the following formula (5) is established, and the ratio of the area in plan view of each of the second optical elements of the multiple second optical elements 210 to the area in plan view of the light guide plate 31 between each of the second optical elements of the multiple second optical elements 210 and the second optical element adjacent to each of the second optical elements of the multiple second optical elements 210 increases farther away from the first optical element 11.

Ratio$_{Gp21}$ (area ratio in first region $Gp21$)<Ratio$_{Gp23}$ (area ratio in third region $Gp23$)<Ratio$_{G25}$ (area ratio in fifth region $Gp25$)　　　(5)

The display apparatus 109 and the display apparatus 110 can further reduce the luminance change, the light amount difference, and the unevenness when the eyebox, the pupil movement, and the distance between pupils change.

As described above, the contents described for the display apparatus according to the seventh embodiment (Example 7 of the display apparatus) of the present technology can be applied to the display apparatus according to the first to sixth embodiments of the present technology and also the display apparatus according to the eighth to tenth embodiments of the present technology described later unless there is a technical contradiction.

9. Eighth Embodiment (Example 8 of Display Apparatus)

A display apparatus according to the eighth embodiment (Example 8 of the display apparatus) of the present technology is a display apparatus including an image display element, a collimating optical system that collimates light emitted from the image display element, a light guide plate on which light emitted from the collimating optical system is incident and that totally reflects and guides the light being incident, a first optical element that is disposed on the light guide plate and introduces the light being incident into the light guide plate, multiple second optical elements (a second optical element group) that are disposed on the light guide plate and emit light propagated by total reflection in the light guide plate to outside of the light guide plate, and a third optical element that guides the light propagated by total reflection in the light guide plate to the multiple second optical elements. For example, the third optical element can turn back the light propagated by total reflection in the light guide plate and guide the light to the multiple second optical elements. In the display apparatus according to the eighth embodiment (Example 8 of the display apparatus) of the present technology, it is preferable that the multiple second optical elements are disposed apart from each other on the light guide plate.

Hereinafter, the display apparatus according to the eighth embodiment (Example 8 of the display apparatus) of the present technology will be specifically described with reference to FIG. 11.

Figure 11:
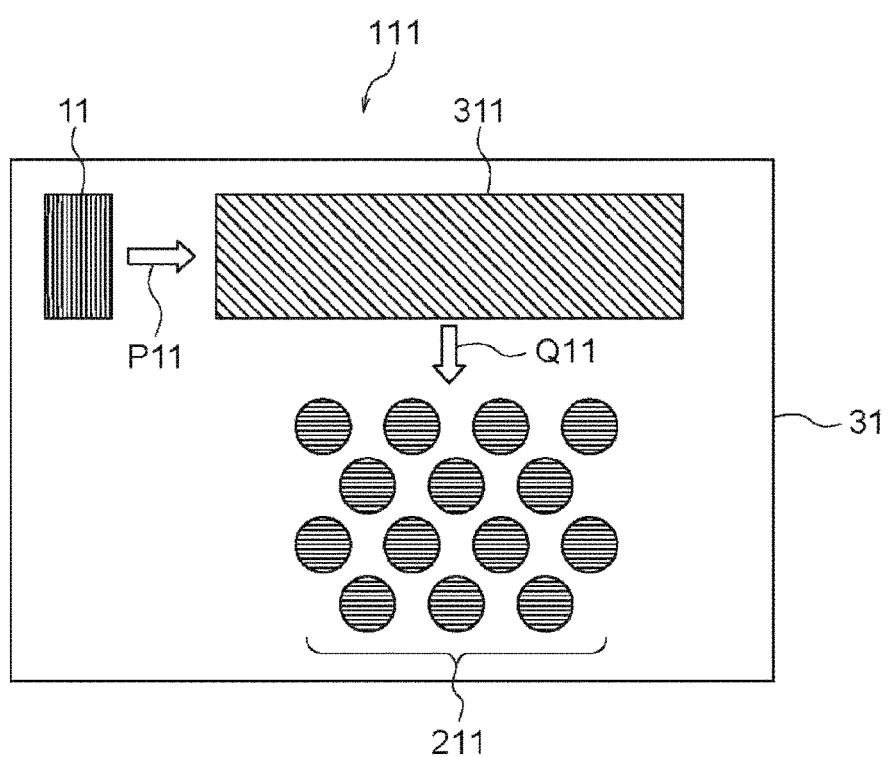
FIG. 11 is a diagram illustrating a configuration example of a display apparatus according to an eighth embodiment to which the present technology is applied.

FIG. 11 is a plan configuration diagram of a display apparatus 111 as the display apparatus according to the eighth embodiment of the present technology.

The display apparatus 111 includes at least an image display element (not shown in FIG. 11), a collimating optical system (not shown in FIG. 11), a light guide plate 31, a first optical element 11 disposed on the light guide plate 31, multiple second optical elements 211 disposed on the light guide plate 31, and a third optical element 311 disposed on the light guide plate 31.

As illustrated in FIG. 11, the light introduced into the light guide plate 31 by the first optical element 11 is propagated to the third optical element 311 (in a direction P11 in FIG. 11) by total reflection in the light guide plate 31, turned back in the light guide plate 31 by the third optical element 311, propagated by total reflection in the light guide plate 31, and guided to the multiple second optical elements (second optical element group) 211 (in a direction Q11 in FIG. 11). Light extracted from the light guide plate 31 by the multiple second optical elements 211 is incident on the eye of the wearer (user), and a video can be viewed.

In the display apparatus 111, although not shown, the first optical element 11, the multiple second optical elements 211, and the third optical element 311 may be formed on the surface of the light guide plate 31 on the opposite side of the pupil side, or may be formed on the surface of the light guide plate 31 on the pupil side.

As described above, the contents described for the display apparatus according to the eighth embodiment (Example 8 of the display apparatus) of the present technology can be applied to the display apparatus according to the first to seventh embodiments of the present technology and also the display apparatus according to the ninth and tenth embodiments of the present technology described later unless there is a technical contradiction.

10. Ninth Eembodiment (Example 9 of Display Apparatus)

A display apparatus according to the ninth embodiment (Example 9 of the display apparatus) of the present technology is a display apparatus including an image display element, a collimating optical system that collimates light emitted from the image display element, a light guide plate on which light emitted from the collimating optical system is incident, and that totally reflects and guides the light being incident a first optical element that is disposed on the light guide plate and introduces the light being incident into the light guide plate, multiple second optical elements (a second optical element group) that are disposed on the light guide plate and emit light propagated by total reflection in the light guide plate to outside of the light guide plate, and a third optical element that guides the light propagated by total reflection in the light guide plate to the multiple second optical elements. For example, the third optical element can turn back the light propagated by total reflection in the light guide plate and guide the light to the multiple second optical elements.

In the display apparatus, diffraction efficiency of each of the second optical elements of the multiple second optical elements may increase farther away from the third optical element, and then, gradually, diffraction efficiency of each of the second optical elements of the multiple second optical elements may increase farther away from the third optical element.

Hereinafter, the display apparatus according to the ninth embodiment (Example 9 of the display apparatus) of the present technology will be specifically described with reference to FIG. 12.

Figure 12:
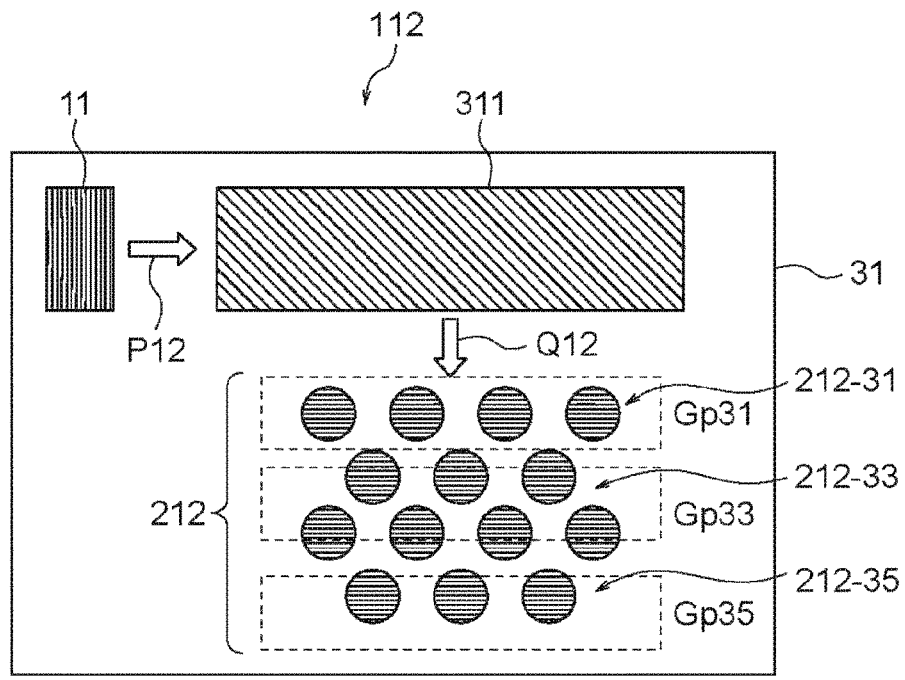
FIG. 12 is a diagram illustrating a configuration example of a display apparatus according to a ninth embodiment to which the present technology is applied.

FIG. 12 is a plan configuration diagram of a display apparatus 112 as the display apparatus according to the ninth embodiment of the present technology.

The display apparatus 112 includes at least an image display element (not shown in FIG. 12), a collimating optical system (not shown in FIG. 12), a light guide plate 31, a first optical element 11 disposed on the light guide plate 31, multiple second optical elements 212 disposed on the light guide plate 31, and a third optical element 311 disposed on the light guide plate 31.

As illustrated in FIG. 12, the light introduced into the light guide plate 31 by the first optical element 11 is propagated to the third optical element 311 (in a direction P12 in FIG. 12) by total reflection in the light guide plate 31, turned back in the light guide plate 31 by the third optical element 311, propagated by total reflection in the light guide plate 31, and guided to the multiple second optical elements (second optical element group) 212 (in a direction Q12 in FIG. 12). Light extracted from the light guide plate 31 by the multiple second optical elements 212 is incident on the eye of the wearer (user), and a video can be viewed.

In the display apparatus 112, although not shown, the first optical element 11, the multiple second optical elements 212, and the third optical element 311 may be formed on the surface of the light guide plate 31 on the opposite side of the pupil side, or may be formed on the surface of the light guide plate 31 on the pupil side.

The multiple second optical elements 212 include, in order from the third optical element 311 (from the upper side to the lower side in FIG. 12), a first region Gp31 including multiple second optical elements 212-31, a third region Gp33 including multiple second optical elements 212-33, and a fifth region Gp35 including multiple second optical elements 212-35.

In the display apparatus 112, a diffraction efficiency ($\eta_{Gp35}$) of each of the second optical elements of the multiple second optical elements 212-35 belonging to the fifth region Gp35 is larger than a diffraction efficiency ($\eta_{Gp33}$) of each of the second optical elements of the multiple second optical elements 212-33 belonging to the third region Gp33, and the diffraction efficiency ($\eta_{Gp33}$) of each of the second optical elements of the multiple second optical elements 212-33 belonging to the third region Gp33 is larger than a diffraction efficiency ($\eta_{Gp31}$) of each of the second optical elements of the multiple second optical elements 212-31 belonging to the first region Gp31.

That is, the following formula (6) is established, and diffraction efficiency of each of the second optical elements of the multiple second optical elements 212 increases farther away from the third optical element 311.

$$\eta_{Gp31} \text{ (diffraction efficiency in first region } Gp31)$$
$$<\eta_{Gp33} \text{ (diffraction efficiency in third region } Gp33)<\eta_{Gp35} \text{ (diffraction efficiency in fifth region } Gp35) \quad (6)$$

The display apparatus 112 can further reduce the luminance change, the light amount difference, and the unevenness when the eyebox, the pupil movement, and the distance between pupils change.

As described above, the contents described for the display apparatus according to the ninth embodiment (Example 9 of the display apparatus) of the present technology can be applied to the display apparatus according to the first to eight embodiments of the present technology and also the display apparatus according to the tenth embodiment of the present technology described later unless there is a technical contradiction.

11. Tenth Embodiment (Example 10 of Display Apparatus)

A display apparatus according to the tenth embodiment (Example 10 of the display apparatus) of the present technology is a display apparatus including an image display element, a collimating optical system that collimates light emitted from the image display element, a light guide plate on which light emitted from the collimating optical system is incident and that totally reflects and guides the light being incident, a first optical element that is disposed on the light guide plate and introduces the light being incident into the light guide plate, multiple second optical elements (a second optical element group) that are disposed on the light guide plate and emit light propagated by total reflection in the light guide plate to outside of the light guide plate, and a third optical element that guides the light propagated by total reflection in the light guide plate to the multiple second optical elements. For example, the third optical element can turn back the light propagated by total reflection in the light guide plate and guide the light to the multiple second optical elements.

In the display apparatus, the distance between each of the second optical elements of the multiple second optical elements and the second optical element adjacent to each of the second optical elements of the multiple second optical elements may decrease farther away from the third optical element, and then, gradually, the distance between each of the second optical elements of the multiple second optical elements and the second optical element adjacent to each of the second optical elements of the multiple second optical elements may decrease farther away from the third optical element, the ratio of the area in plan view of each of the second optical elements of the multiple second optical elements to the area in plan view of the light guide plate between each of the second optical elements of the multiple second optical elements and the second optical element adjacent to each of the second optical elements of the multiple second optical elements may increase farther away from the third optical element, and then, gradually, the ratio of the area in plan view of each of the second optical elements of the multiple second optical elements to the area in plan view of the light guide plate between each of the second optical elements of the multiple second optical elements and the second optical element adjacent to each of the second optical elements of the multiple second optical elements may increase farther away from the third optical element, and the distance between each of the second optical elements of the multiple second optical elements and the second optical element adjacent to each of the second optical elements of the multiple second optical elements may decrease farther away from the third optical element, and then, gradually, the ratio of the area in plan view of each of the second optical elements of the multiple second optical elements to the area in plan view of the light guide plate between each of the second optical elements of the multiple second optical elements and the second optical element adjacent to each of the second optical elements of the multiple second optical elements may increase farther away from the third optical element, and the distance between each of the second optical elements of the multiple second optical elements and the second optical element adjacent to each of the second optical elements of the multiple second optical element may increase farther away from the third optical element, and also gradually, the ratio of the area in plan view of each of the second optical elements of the multiple second optical elements to the area in plan view of the light guide plate between each of the second optical elements of the multiple second optical elements and the second optical element adjacent to each of the second optical elements of the multiple second optical elements may increase farther away from the third optical element.

Hereinafter, the display apparatus according to the tenth embodiment (Example 10 of the display apparatus) of the present technology will be specifically described with reference to FIG. 13.

Figure 13:
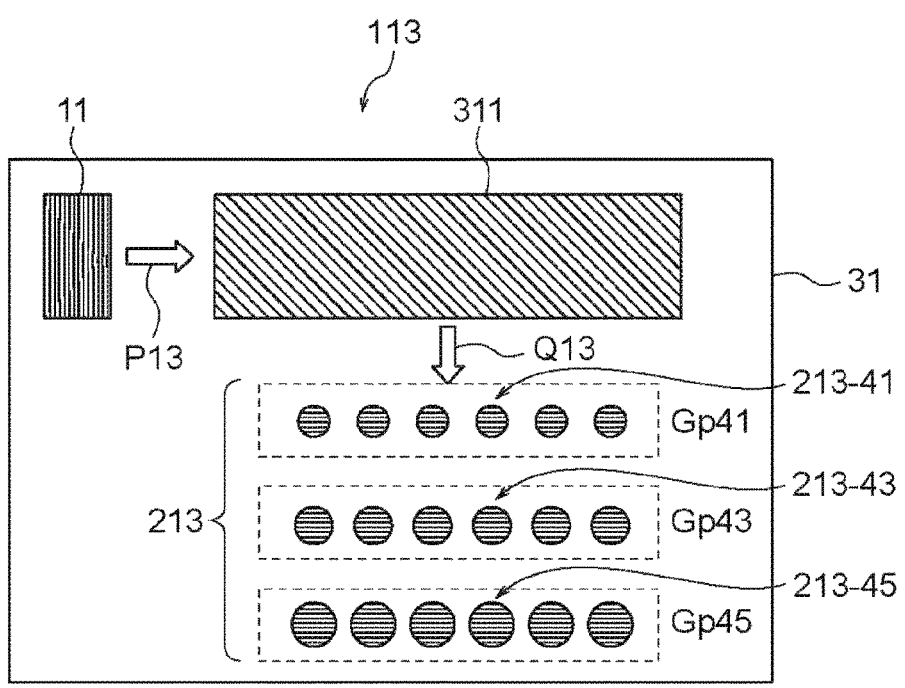
FIG. 13 is a diagram illustrating a configuration example of a display apparatus according to a tenth embodiment to which the present technology is applied.

FIG. 13 is a plan configuration diagram of a display apparatus 113 as the display apparatus according to the tenth embodiment of the present technology.

The display apparatus 113 includes at least an image display element (not shown in FIG. 13), a collimating optical system (not shown in FIG. 13), a light guide plate 31, a first optical element 11 disposed on the light guide plate 31, multiple second optical elements 213 disposed on the light guide plate 31, and a third optical element 311 disposed on the light guide plate 31.

As illustrated in FIG. 13, the light introduced into the light guide plate 31 by the first optical element 11 is propagated to the third optical element 311 (in a direction P13 in FIG. 13) by total reflection in the light guide plate 31, turned back in the light guide plate 31 by the third optical element 311, propagated by total reflection in the light guide plate 31, and guided to the multiple second optical elements (second optical element group) 213 (in a direction Q13 in FIG. 13). Light extracted from the light guide plate 31 by the multiple second optical elements 213 is incident on the eye of the wearer (user), and a video can be viewed.

In the display apparatus 113, although not shown, the first optical element 11, the multiple second optical elements 213, and the third optical element 311 may be formed on the surface of the light guide plate 31 on the opposite side of the pupil side, or may be formed on the surface of the light guide plate 31 on the pupil side.

The multiple second optical elements 213 include, in order from the third optical element 311 (from the upper side to the lower side in FIG. 13), a first region Gp41 including multiple second optical elements 213-41, a third region Gp43 including multiple second optical elements 213-43, and a fifth region Gp45 including multiple second optical elements 213-45.

In the display apparatus 113, a distance ($d_{Gp45}$) between each of the optical elements of the multiple second optical elements 213-45 belonging to the fifth region Gp45 and the second optical element adjacent to each of the second optical elements of the multiple second optical elements 213-45 is smaller than a distance ($d_{Gp43}$) between each of the optical elements of the multiple second optical elements 213-43 belonging to the third region Gp43 and the second optical element adjacent to each of the second optical elements of the multiple second optical elements 213-43. The distance ($d_{Gp43}$) between each of the optical elements of the multiple second optical elements 213-43 belonging to the third region Gp43 and the second optical element adjacent to each of the second optical elements of the multiple second optical elements 213-43 is smaller than a distance ($d_{Gp41}$) between each of the optical elements of the multiple second optical elements 213-41 belonging to the first region Gp41 and the second optical element adjacent to each of the second optical elements of the multiple second optical elements 213-41.

That is, the following formula (7) is established, and the distance between each of the second optical elements of the multiple second optical elements 213 and the second optical element adjacent to each of the second optical elements of the multiple second optical elements 213 decreases farther away from the third optical element 311.

$$d_{Gp41} \text{ (distance in first region } Gp41) > d_{Gp43} \text{ (distance in third region } Gp43) > d_{Gp45} \text{ (distance in fifth region } Gp45) \tag{7}$$

In addition, in the display apparatus 113, a ratio (Ratio$_{Gp45}$) of an area in plan view of each of the second optical elements of the multiple second optical elements 213-45 belonging to a fifth region Gp45 to an area in plan view of the light guide plate 31 between each of the second optical elements of the multiple second optical elements 213-45 and the second optical element adjacent to each of the second optical elements of the multiple second optical elements 213-45 is larger than a ratio (Ratio$_{Gp43}$) of an area in plan view of each of the second optical elements of the multiple second optical elements 213-43 belonging to the third region Gp43 to an area in plan view of the light guide plate 31 between each of the second optical elements of the multiple second optical elements 213-43 and the second optical element adjacent to each of the second optical elements of the multiple second optical elements 213-43. A ratio (Ratio$_{Gp43}$) of an area in a plan view of each of the second optical elements of the multiple second optical elements 213-43 belonging to the third region Gp43 to an area in a plan view of the light guide plate 31 between each of the second optical elements of the multiple second optical elements 213-43 and the second optical element adjacent to each of the second optical elements of the multiple second optical elements 213-43 is larger than a ratio (Ratio$_{Gp41}$) of an area of each of the second optical elements of the multiple second optical elements 213-41 belonging to the first region Gp41 to an area in plan view of the light guide plate 31 between each of the second optical elements of the multiple second optical elements 213-41 and the second optical element adjacent to each of the second optical elements of the multiple second optical elements 213-41.

That is, the following formula (8) is established, and the ratio of the area in plan view of each of the second optical elements of the multiple second optical elements 213 to the area in plan view of the light guide plate 31 between each of the second optical elements of the multiple second optical elements 213 and the second optical element adjacent to each of the second optical elements of the multiple second optical elements 213 increases farther away from the third optical element 311.

$$\text{Ratio}_{Gp41} \text{ (area ratio in first region } Gp41) < \text{Ratio}_{Gp43} \text{ (area ratio in third region } Gp43) < \text{Ratio}_{Gp45} \text{ (area ratio in fifth region } Gp45) \tag{8}$$

The display apparatus 113 can further reduce the luminance change, the light amount difference, and the unevenness when the eyebox, the pupil movement, and the distance between pupils change.

As described above, the contents described for the display apparatus according to the tenth embodiment (Example 10 of the display apparatus) of the present technology can be applied to the display apparatus according to first to ninth embodiments of the present technology described above unless there is a technical contradiction.

Note that the embodiments of the present technology are not limited to each of the above embodiments, and various modifications can be made without departing from the gist of the present technology.

Furthermore, the effects herein described are merely examples and are not limited, and furthermore, other effects may be obtained.

In addition, the present technology can also employ the following configurations.

[1] A display apparatus includes an image display element, a collimating optical system that collimates light emitted from the image display element, a light guide plate on which light emitted from the collimating optical system is incident, and that totally reflects and guides the light being incident, a first optical element that is disposed on the light guide plate and introduces the light being incident into the light guide plate, and multiple second optical elements that are disposed on the light guide plate and emit light propagated by total reflection in the light guide plate to outside of the light guide plate.

[2] In the display apparatus according to [1], the multiple second optical elements are disposed apart from each other.

[3] In the display apparatus according to [1] or [2], the multiple second optical elements and the light guide plate are formed by integral molding.

[4] In the display apparatus according any one of [1] to [3], the multiple second optical elements and the light guide plate include substantially a same material.

[5] In the display apparatus according to [1] or [2], the multiple second optical elements and the light guide plate are formed by integral molding, and the multiple second optical elements and the light guide plate include substantially a same material.

[6] In the display apparatus according to any one of [1] to [5], each of the multiple second optical elements includes a reflective or transmissive volume hologram.

[7] In the display apparatus according to any one of [1] to [6], the first optical element includes a reflective or transmissive volume hologram.

[8] In the display apparatus according to any one of [1] to [5], each of the first optical element and the multiple second optical elements includes a reflective or transmissive volume hologram.

[9] In the display apparatus according to any one of [1] to [8], the first optical element includes a light transmitting member.

[10] In the display apparatus according to any one of [1] to [9], the first optical element includes a light reflecting member.

[11] In the display apparatus according to any one of [1] to [10], the light guide plate has at least a first surface and a second surface, the first surface is disposed on a pupil side, the second surface is disposed on an opposite side of the pupil side, the multiple second optical elements are disposed on the first surface, and the multiple second optical elements are disposed on the second surface.

[12] In the display apparatus according to [11], the multiple second optical elements disposed on the first surface and the multiple second optical elements disposed on the second surface face each other.

[13] In the display apparatus according to [11] or [12], an amount of transmitted diffracted light transmitted through the multiple second optical elements disposed on the first surface is larger than an amount of reflected diffracted light reflected by the multiple second optical elements disposed on the first surface.

[14] In the display apparatus according to any one of [11] to [13], an amount of transmitted diffracted light transmitted through the multiple second optical elements disposed on the second surface is smaller than an amount of reflected diffracted light reflected by the multiple second optical elements disposed on the second surface.

[15] In the display apparatus according to [11] or [12], the amount of transmitted diffracted light transmitted through the multiple second optical elements disposed on the first surface is larger than the amount of reflected diffracted light reflected by the multiple second optical elements disposed on the first surface, and the amount of transmitted diffracted light transmitted through the multiple second optical elements disposed on the second surface is smaller than the amount of reflected diffracted light reflected by the multiple second optical elements disposed on the second surface.

[16] In the display apparatus according to any one of [1] to [15], each of the second optical elements of the multiple second optical elements has diffraction efficiency that increases farther away from the first optical element.

[17] In the display apparatus according to any one of [1] to [16], a distance between each of the second optical elements of the multiple second optical elements and the second optical element adjacent to each of the second optical elements of the multiple second optical elements decreases farther away from the first optical element.

[18] In the display apparatus according to any one of [1] to [17], a ratio of an area in plan view of each of the second optical elements of the multiple second optical elements to an area in plan view of the light guide plate between each of the second optical elements of the multiple second optical elements and the second optical element adjacent to each of the second optical elements of the multiple second optical elements increases farther away from the first optical element.

[19] A display apparatus includes an image display element, a collimating optical system that collimates light emitted from the image display element, a light guide plate on which light emitted from the collimating optical system is incident and that totally reflects and guides the light being incident, a first optical element that is disposed on the light guide plate and introduces the light being incident into the light guide plate, a multiple second optical elements that are disposed on the light guide plate and emit light propagated by total reflection in the light guide plate to outside of the light guide plate, and a third optical element that guides the light propagated by total reflection in the light guide plate to the multiple second optical elements.

[20] In the display apparatus according to [19], the third optical element turns back the light propagated by total reflection in the light guide plate and guides the light to the multiple second optical elements.

[21] In the display apparatus according to [19] or [20], the multiple second optical elements are disposed apart from each other.

[22] In the display apparatus according to any one of [19] to [21], the multiple second optical elements and the light guide plate are formed by integral molding.

[23] In the display apparatus according any one of [19] to [22], the multiple second optical elements and the light guide plate include substantially the same material.

[24] In the display apparatus according to any one of [19] to [21], the multiple second optical elements and the light guide plate are formed by integral molding, and the multiple second optical elements and the light guide plate include substantially the same material.

[25] In the display apparatus according to any one of [19] to [24], each of the multiple second optical elements includes a reflective or transmissive volume hologram.

[26] In the display apparatus according to any one of [19] to [25], the first optical element includes a reflective or transmissive volume hologram.

[27] In the display apparatus according to any one of [19] to [24], each of the first optical element and the multiple second optical elements includes a reflective or transmissive volume hologram.

[28] In the display apparatus according to any one of [19] to [27], the first optical element includes a light transmitting member.

[29] In the display apparatus according to any one of [19] to [28], the first optical element includes a light reflecting member.

[30] In the display apparatus according to any one of [19] to [29], the light guide plate has at least a first surface and a second surface, the first surface is disposed on a pupil side, the second surface is disposed on an opposite side of the pupil side, the multiple second optical elements are disposed on the first surface, and the multiple second optical elements are disposed on the second surface.

[31] In the display apparatus according to [30], the multiple second optical elements disposed on the first surface and the multiple second optical elements disposed on the second surface face each other.

[32] In the display apparatus according to [30] or [31], an amount of transmitted diffracted light transmitted through the multiple second optical elements disposed on the first surface is larger than an amount of reflected diffracted light reflected by the multiple second optical elements disposed on the first surface.

[33] In the display apparatus according to any one of [30] to [32], an amount of transmitted diffracted light transmitted through the multiple second optical elements disposed on the second surface is smaller than an amount of reflected diffracted light reflected by the multiple second optical elements disposed on the second surface.

[34] In the display apparatus according to [30] or [31], the amount of transmitted diffracted light transmitted through the multiple second optical elements disposed on the first surface is larger than the amount of reflected diffracted light reflected by the multiple second optical elements disposed on the first surface, and the amount of transmitted diffracted light transmitted through the multiple second optical elements disposed on the second surface is smaller than the amount of reflected diffracted light reflected by the multiple second optical elements disposed on the second surface.

[35] In the display apparatus according to any one of [19] to [34], each of the second optical elements of the multiple second optical elements has diffraction efficiency that increases farther away from the third optical element.

[36] In the display apparatus according to any one of [19] to [35], a distance between each of the second optical elements of the multiple second optical elements and the second optical element adjacent to each of the second optical elements of the multiple second optical elements decreases farther away from the third optical element.

[37] In the display apparatus according to any one of [19] to [36], a ratio of an area in plan view of each of the second optical elements of the multiple second optical elements to an area in plan view of the light guide plate between each of the second optical elements of the multiple second optical elements and the second optical element adjacent to each of the second optical elements of the multiple second optical elements increases farther away from the third optical element.

REFERENCE SIGNS LIST

11 First optical element
11-5a, 11-5b Light guide plate incident portion 21, 22b, 24, 25a, 25b, 26a-1, 26a-2, 28, 28-1, 28-3, 28-5, 29, 29-11, 29-13, 29-15, 210, 210-21, 210-23, 210-25, 211, 212, 212-31, 212-33, 212-35, 213, 213-41, 213-43, 213-45 Multiple second optical elements (second optical element group) 22b-1, 22b-2, 22b-3, 23b-1, 23b-2, 23b-3, 24a, 27-1, 27-2 Second optical element
31 Light guide plate
41 Image display element
51 Collimating optical system
240 Photosensitive composition for hologram recording
311 Third optical element
400 Mask
500 Eyeball
500-1 Pupil
S1 First surface of light guide plate on pupil side
S2 Second surface of light guide plate on opposite side of pupil side
L1 Light traveling in direction of pupil
L2 Light traveling in direction opposite to direction of pupil
L3 Light propagated by total reflection in light guide plate
L17-1 Transmitted diffracted light
L17-2 Reflected diffracted light
L71, L72 Angle-of-view light

The invention claimed is:

1. A display apparatus, comprising:
an image display element;
a collimating optical system configured to collimate light emitted from the image display element;
a light guide plate on which light emitted from the collimating optical system is incident, wherein
the light guide plate is configured to guide the incident light by total reflection,
the light guide plate has a first surface and a second surface,
the first surface is on a pupil side, and
the second surface is on an opposite side of the pupil side;
a first optical element on the light guide plate, wherein the first optical element is configured to introduce the incident light into the light guide plate; and
a plurality of second optical elements that includes a first set of second optical elements and a second set of second optical elements, wherein
the first set of second optical elements are on the first surface of the light guide plate,
the second set of second optical elements are on the second surface of the light guide plate, and
the plurality of second optical elements is configured to emit light propagated by the total reflection in the light guide plate to outside of the light guide plate.

2. The display apparatus according to claim 1, wherein optical elements of the plurality of second optical elements are spaced apart.

3. The display apparatus according to claim 1, wherein the plurality of second optical elements is integrally molded with the light guide plate.

4. The display apparatus according to claim 1, wherein the plurality of second optical elements and the light guide plate include substantially a same material.

5. The display apparatus according to claim 1, wherein
the plurality of second optical elements is integrally molded with the light guide plate, and
the plurality of second optical elements and the light guide plate include substantially a same material.

6. The display apparatus according to claim 1, wherein each second optical element of the plurality of second optical elements includes one of a reflective volume hologram or a transmissive volume hologram.

7. The display apparatus according to claim 1, wherein the first optical element includes one of a reflective volume hologram or a transmissive volume hologram.

8. The display apparatus according to claim 1, wherein each optical element of the first optical element and the plurality of second optical elements includes one of a reflective volume hologram or a transmissive volume hologram.

9. The display apparatus according to claim 1, wherein the first optical element includes a light transmitting member.

10. The display apparatus according to claim 1, wherein the first optical element includes a light reflecting member.

11. The display apparatus according to claim 1, wherein the first set of second optical elements on the first surface faces the second set of second optical elements disposed on the second surface.

12. The display apparatus according to claim 1, wherein an amount of transmitted diffracted light transmitted through the first set of second optical elements on the first surface is larger than an amount of reflected diffracted light reflected by the first set of second optical elements on the first surface.

13. The display apparatus according to claim 1, wherein an amount of transmitted diffracted light transmitted through the second set of second optical elements on the second surface is smaller than an amount of reflected diffracted light reflected by the second set of second optical elements on the second surface.

14. The display apparatus according to claim 1, wherein
an amount of transmitted diffracted light transmitted through the first set of second optical elements on the first surface is larger than an amount of reflected diffracted light reflected by the first set of second optical elements on the first surface, and
the amount of the transmitted diffracted light transmitted through the multiple second set of second optical elements on the second surface is smaller than the amount of the reflected diffracted light reflected by the second set of second optical elements on the second surface.

15. The display apparatus according to claim 1, wherein each of the second optical element of the plurality of second optical elements has a diffraction efficiency that increases farther away from the first optical element.

16. The display apparatus according to claim 1, wherein a distance between each second optical element of the plurality of second optical elements and an adjacent second optical element adjacent to a respective second optical element of the plurality of second optical elements decreases farther away from the first optical element.

17. The display apparatus according to claim 1, wherein a ratio of an area in plan view of a group of second optical elements of the plurality of second optical elements to an area in the plan view of the light guide plate increases farther away from the first optical element.

18. A display apparatus, comprising:
an image display element;
a collimating optical system configured to collimate light emitted from the image display element;
a light guide plate on which light emitted from the collimating optical system is incident, wherein the light guide plate is configured to guide the incident light by total reflection;
a first optical element on the light guide plate, wherein the first optical element is configured to introduce the incident light into the light guide plate; and
a plurality of second optical elements on the light guide plate, wherein
the plurality of second optical elements is configured to emit light propagated by the total reflection in the light guide plate to outside of the light guide plate, and
each second optical element of the plurality of second optical elements has a diffraction efficiency that increases farther away from the first optical element.

* * * * *